(12) United States Patent
Le Dantec et al.

(10) Patent No.: US 6,542,553 B1
(45) Date of Patent: Apr. 1, 2003

(54) DEVICE AND METHOD FOR TRANSMITTING DIGITAL DATA, DEVICE AND METHOD FOR RECEIVING DIGITAL DATA AND COMMUNICATION DEVICES USING THEM

(75) Inventors: Claude Le Dantec, Saint Hilaire des Landes (FR); Philippe Piret, Cesson Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/994,325

(22) Filed: Dec. 19, 1997

(30) Foreign Application Priority Data

Dec. 23, 1996 (FR) .............................. 96 15861

(51) Int. Cl.[7] .......................... H04L 23/02; H04L 5/12
(52) U.S. Cl. ........................ 375/261; 375/298
(58) Field of Search .................. 375/259, 261, 375/262, 265, 295, 298, 316, 340, 341; 329/304; 332/103; 371/37.11, 43.1, 43.4, 43.7; 714/784, 786, 792, 795

(56) References Cited

U.S. PATENT DOCUMENTS

| | | | |
|---|---|---|---|
| 3,311,879 A | | 3/1967 | Daher |
| 4,483,012 A | * | 11/1984 | Wei .............................. 375/261 |
| 5,226,043 A | | 7/1993 | Pughe, Jr. et al. .......... 371/40.1 |
| 5,377,194 A | * | 12/1994 | Calderbank .............. 370/110.1 |
| 5,659,578 A | * | 8/1997 | Alamouti et al. ............ 375/261 |
| 5,659,579 A | * | 8/1997 | Herzberg ..................... 375/262 |
| 5,838,727 A | * | 11/1998 | Lyon et al. .................. 375/261 |
| 5,881,047 A | * | 3/1999 | Bremer et al. ............... 370/207 |

FOREIGN PATENT DOCUMENTS

EP 0 647 035 9/1994

OTHER PUBLICATIONS

Ken–chi Konishi et al., "Error–Rate Performance of Block–Coded M–ary Modulation and Hard Decision Decoding Systems on Rayleigh Fading Channel" *Electronics and Communications in Japan,* Part 1, vol. 74, No. 6, pp 97–106 (1991).

* cited by examiner

*Primary Examiner*—Jean Corrielus
(74) *Attorney, Agent, or Firm*—Fitzpatrick, Cella, Harper & Scinto

(57) ABSTRACT

A transmission device has labeling means adapted to map each symbol of a first alphabet to secondary digital data belonging to a second alphabet having Q symbols, Q being strictly greater than P, wherein P symbols of the second alphabet each exclusively represent one and only one symbol of the first alphabet. A coder determines redundant data belonging to the second alphabet, using coding rules that take into account the secondary digital data. A transmitter modulates a physical quantity into a series of signals each capable of taking a number P of different values, and according to transmission rules successively representing the digital data to be transmitted and the redundant data.

59 Claims, 11 Drawing Sheets

DEVICE AND METHOD FOR TRANSMITTING DIGITAL DATA, DEVICE AND METHOD FOR RECEIVING DIGITAL DATA AND COMMUNICATION DEVICES USING THEM

BACKGROUND OF THE INVENTION

1. Field of the Invention

The present invention relates to a device and a method for coding data, a device and a method for decoding data and communication devices using them.

This invention is of use in all areas of coding, storage and transmission of digital data, and in particular those using an alphabet in which the number of symbols is different from 256.

In particular, the present invention applies to transmission of sextuples, modulated by an amplitude modulation in accordance with two carriers in quadrature (hereinafter called "QAM") with 64 states (hereinafter called "QAM-64").

2. Description of the Prior Art

There are many coding methods allowing error correction of digital data. Among the best known codes used at present, the Reed-Solomon codes may be mentioned. These constitute a powerful means of correcting data transmission errors. They may be constructed on any alphabet containing a number of symbols which is equal to a power, $p^m$, of a prime number, p.

Very often a value of m equal to 8 and a value of p equal to 2 is chosen. The consequence of this large predominance of codes on alphabets with $2^8$ (=256) symbols is that the majority of Reed-Solomon coders and decoders which are found on the market work on this alphabet. Their low relative cost and their high efficiency means that they are used in many areas notably in the transmission or storage of digital data on tape or disc. This is because a Reed-Solomon coder or decoder constructed to work on $2^8$ symbols can also work on an alphabet containing $2^4$ (=16), $2^2$ (=4) or $2^1$ (=2) symbols. The corresponding codes are commonly known under the name "BCH codes" on respectively $GF(2^4)$, $GF(2^2)$ or $GF(2)$ (where GF means "Galois Field"). Nevertheless, an alphabet with 64 symbols cannot be treated in this way because the Galois field $GF(2^6)$ is not a sub-field of $GF(2^8)$.

Therefore, when the natural alphabet of an application contains 64 symbols, as in a system using a QAM-64 modulation, these symbols cannot be considered as words of a code on $GF(2^8)$.

Consequently, in the case of transmission of data modulated with a QAM-64 modulation, a person skilled in the art of transmission wishing to use inexpensive Reed-Solomon coding components uses them in a non-optimal way: he considers a sequence of binary data as a flow of octets which he codes with a Reed-Solomon coder. The code words produced are considered with no particular care as a sequence of 6-uples; each 6-uple is finally modulated in the form of a QAM-64 symbol.

On receipt, each symbol received is interpreted as a binary 6-uple. The resulting sequence of binary data is considered as a sequence of octets specifying one $GF(2^8)$ element. This sequence of $GF(2^8)$ elements, entering a Reed-Solomon decoder corresponding to the coder used at transmission, will be decoded in an ordinary manner. This manner of formatting QAM-64 symbols in octets has a significant drawback. As in any transmission system, transmission errors occur on QAM-64 symbols. However, the 6 bits of the same QAM-64 symbol may have been coded over two consecutive octets. As the Reed-Solomon decoder works on octets, it is possible that an error on a single QAM-64 symbol could produce an error on two consecutive octets, which amounts to doubling the error affecting the data transmitted in this manner. This reduces the correction capability of a Reed-Solomon coder expressed as a number of correctable QAM-64 symbols.

In order to solve the problem disclosed previously, a code specified on $GF(2^6)$ could be chosen. Two other problems then arise:

on the one hand, in this case, a component of this type is not readily found today on general sale, and on the other hand, if it is wished to use words of length greater than or equal to 64 binary 6-uples, no Reed-Solomon code of this length is known on $GF(2^6)$.

Consequently, the redundancy of the codes is used less efficiently; for a given power of correction, a greater redundancy is required (in other words, the efficiency of the code is lower).

SUMMARY OF THE INVENTION

The present invention intends to remedy these drawbacks. It aims, above all, to allow the transmission of symbols forming part of an alphabet having a number of symbols equal to the alphabet used by a transmission means, while coding the said symbols with a code adapted to another alphabet.

To this end, the invention relates, according to a first aspect, to a device for transmitting digital data to be transmitted, representing a physical quantity and belonging to a first alphabet having P symbols, characterized in that it has:

a labelling means adapted to map each symbol of the first alphabet to secondary digital data belonging to a second alphabet having Q symbols, with Q strictly greater than P, P symbols of the second alphabet each representing exclusively one and only one symbol of the first alphabet, a coding means adapted to determine redundant data belonging to the second alphabet, using predetermined coding rules taking into account the secondary digital data, and a transmission means adapted to modulate at least one physical quantity into a series of signals each capable of taking a number P of different values, and successively representing, according to predetermined transmission rules, on the one hand, the digital data to be transmitted and, on the other hand, the said redundant data.

Correlatively, the invention relates, according to a second aspect, to a device for receiving signals representing so-called "to be transmitted" digital data belonging to a first alphabet having P symbols, characterised in that it has:

an identification means adapted to receive received digital data belonging to an alphabet having P symbols, and to map received digital data to so-called "to be decoded" symbols belonging to an alphabet having Q symbols, with Q strictly greater than P, a decoding means adapted to correct errors affecting the symbols to be decoded, using predetermined decoding rules taking into account so-called "redundant" symbols to be decoded, and to supply so-called "corrected" symbols, and a translation means adapted to supply so-called "transmitted" digital data capable of taking a number P of different values, and successively representing, according to predetermined so-called "translation" rules, corrected symbols.

Correlatively, the invention relates, according to a third aspect, to a method for transmitting digital data to be transmitted, representing a physical quantity and belonging to a first alphabet having P symbols, characterized in that it has:

- a labelling step during which each symbol of the first alphabet is mapped to secondary digital data belonging to a second alphabet having Q symbols, with Q strictly greater than P, P symbols of the second alphabet each representing exclusively one and only one symbol of the first alphabet,
- a coding step during which redundant data belonging to the second alphabet are determined, using predetermined coding rules taking into account the secondary digital data, and
- a transmission step during which at least one physical quantity is modulated into a series of signals each capable of taking a number P of different values, and successively representing, according to predetermined transmission rules, on the one hand, digital data to be transmitted and, on the other hand, the said redundant data.

Correlatively, the invention relates, according to a third aspect, to a method for receiving signals representing so-called "to be transmitted" digital data belonging to a first alphabet having P symbols, characterized in that it has:

- an identification step during which digital data belonging to an alphabet having P symbols are received, and received digital data are mapped to so-called "to be decoded" symbols belonging to an alphabet having Q symbols, with Q strictly greater than P,
- a decoding step during which errors affecting the symbols to be decoded are corrected, using predetermined decoding rules taking into account so-called "redundant" symbols to be decoded, and to supply so-called "corrected" symbols, and
- a translation step during which so-called "transmitted" digital data capable of taking a number P of different values are supplied, successively representing, according to predetermined so-called "translation" rules, corrected symbols.

By virtue of these provisions, the coding means used, which works on the second alphabet, may be of a lower cost than a coding means working on the first alphabet.

Furthermore, the symbols transmitted by the transmission means represent, at least partially, digital data of the first alphabet, which makes it possible to not transmit, to represent them, symbols of the second alphabet. In this way, the invention makes it possible to optimize the number of elementary symbols, that is to say generally the binary symbols, which represent both the data to be transmitted and the redundant symbols. The invention thus makes it possible to increase the efficiency of the transmission.

According to preferential characteristics of the first aspect of the invention:

the labelling means is adapted to add predetermined digital data to each symbol of the first alphabet in order to form the secondary digital data belonging to the second alphabet which correspond to the symbol of the first alphabet, and advantageously the labelling means is adapted to add identical digital data to each symbol of the first alphabet in order to form the secondary digital data belonging to the second alphabet which correspond to the symbol of the first alphabet.

Correlatively, according to preferential characteristics of the second aspect of the invention:

the translation means is adapted to receive corrected symbols each capable of being represented by a sequence of binary data and to supply transmitted digital data items each representing segments of the sequences and advantageously the translation means is adapted to remove predetermined digital data from each corrected symbol in order to form a transmitted digital data item.

Correlatively, according to preferential characteristics of the third aspect of the invention:

during the labelling step, predetermined digital data are added to each symbol of the first alphabet in order to form the secondary digital data belonging to the second alphabet which correspond to the symbol of the first alphabet and advantageously during the labelling step, identical digital data are added to each symbol of the first alphabet in order to form the secondary digital data belonging to the second alphabet which correspond to the symbol of the first alphabet.

Correlatively, according to preferential characteristics of the fourth aspect of the invention:

during the translation step, corrected symbols each capable of being represented by a sequence of binary data are received and transmitted digital data items each representing segments of the sequences are supplied and advantageously during the translation step, predetermined digital data are removed from each corrected symbol in order to form a transmitted digital data item.

By virtue of these provisions, the labelling means is particularly easy to implement. It may, in fact, be composed only of electrical connections maintained at a constant potential, for example at ground, these connections representing the added digital data.

According to preferential characteristics of the first aspect of the invention, the transmission device as briefly explained above has a preselection means adapted:

to receive, from the coding means, the redundant symbols which belong to the alphabet having a number Q of symbols, and to supply digital data to the transmission means.

Advantageously, the preselection means is adapted to receive redundant symbols each capable of being represented by a sequence of binary data and to supply digital data items each representing segments of the said sequences.

Correlatively, according to preferential characteristics of the third aspect of the invention, the transmission method as briefly explained above has a preselection step during which:

following the coding step, the redundant symbols which belong to the alphabet having a number Q of symbols are received, and digital data are supplied which are then processed during the transmission step.

Advantageously, during the preselection step, redundant symbols each capable of being represented by a sequence of binary data are received and digital data items each representing segments of the sequences are supplied.

By virtue of these provisions, the preselection means is particularly easy to implement.

According to preferential characteristics of the first aspect of the invention, the transmission device as briefly explained above has a mapping means adapted to map, according to a set of predetermined so-called "mapping" rules, each digital data couple selected by the selection means to an amplitude couple, the transmission means being adapted to perform the transmission of the signal in quadrature, with its two components being respectively modified by the first and second amplitudes of the said amplitude couples.

Advantageously, the set of predetermined mapping rules includes at least the first rule according to which, when an estimated probability that two amplitude couples are confused (i.e., are mistaken) after the transmission is greater than a first predetermined value, then the digital data couples corresponding to the two amplitude couples have first or second digital data items of the same value.

By virtue of these provisions, the most probable errors affecting the components of a signal transmitted by the transmission means affect only one of the digital data items of the digital data couple which corresponds to this signal.

Thus, even when these digital data do not have any redundancy capable of allowing the detection or correction of certain of the errors affecting them, the invention makes it possible to reduce the consequences of these errors.

When these digital data have redundant items capable of allowing the correction of errors affecting signal components, the invention makes it possible:

to reduce the number of redundant items necessary to correct a given number of errors, to increase the number of errors which can be corrected by the use of a given number of redundant items, and to increase the efficiency of the transmission.

In general, each redundant item makes it possible to correct one error affecting a digital data item. By virtue of the invention, each redundant item makes it possible, for the most probable errors, to correct at least one error affecting a signal (and more than one error, when the digital data items corresponding to two signals are connected and therefore corrected simultaneously).

According to particular characteristics of the first aspect of the invention:

the preselection means is adapted to receive redundant symbols each capable of being represented by a sequence of an even number of binary data items and to supply digital data items each representing half of the binary data items of the sequence, and/or the set of predetermined mapping rules includes at least the rule according to which, when an estimated probability that two amplitude couples are confused after the transmission is greater than a first predetermined value, then one of the digital data couples corresponding to the two amplitude couples does not represent any digital data coming from the preselection means.

Correlatively, according to particular characteristics of the third aspect of the invention:

during the preselection step, redundant symbols each capable of being represented by a sequence of an even number of binary data items are received and digital data items each representing half of the binary data items of the sequence are supplied and/or the set of predetermined mapping rules includes at least the rule according to which, when an estimated probability that two amplitude couples are confused after the transmission is greater than a first predetermined value, then one of the digital data couples corresponding to the two amplitude couples does not represent any digital data processed during the preselection step.

By virtue of these provisions, the most probable errors affecting the components of a signal transmitted by the transmission means do not affect any of the redundant symbols.

The present invention thus makes it possible to optimise, for a given coding efficiency, the error detection and correction power of error correction components (for example Reed-Solomon codes) of low cost, in particular working on GF(256), in the case of a transmission modulated with a QAM-64.

Furthermore, it should be noted that lengths of code words, that is to say in this case redundant symbols, greater than 63 6-uples can be used.

Thus the symbols which can be represented by a single component couple of a signal can benefit from a coding performed in an alphabet of which all the symbols cannot be represented by a single component couple of a signal.

The invention also relates to a network characterized in that it has a transmission medium, at least one transmission device as briefly disclosed above and at least one receiving device as briefly disclosed above, the signals transmitted by the transmission means of the transmission device being received, possibly affected by errors, by the receiving means of the receiving device.

The advantages of this network are identical to those described above and are therefore not repeated here.

BRIEF DESCRIPTION OF THE DRAWINGS

The characteristics, advantages and other objects of the invention will furthermore emerge from the description of the accompanying drawings in which.

DESCRIPTION OF THE PREFERRED EMBODIMENTS

In the embodiment described below, a Reed-Solomon coding is considered, working on octets, a coding which, for five symbols to be coded, would supply three redundant symbols. The proportion of the number of redundant symbols to the corresponding number of symbols to be coded (in this case 0.6), is greater than the proportions commonly used (of the order of a few percent), for explanatory purposes.

Figure 1:
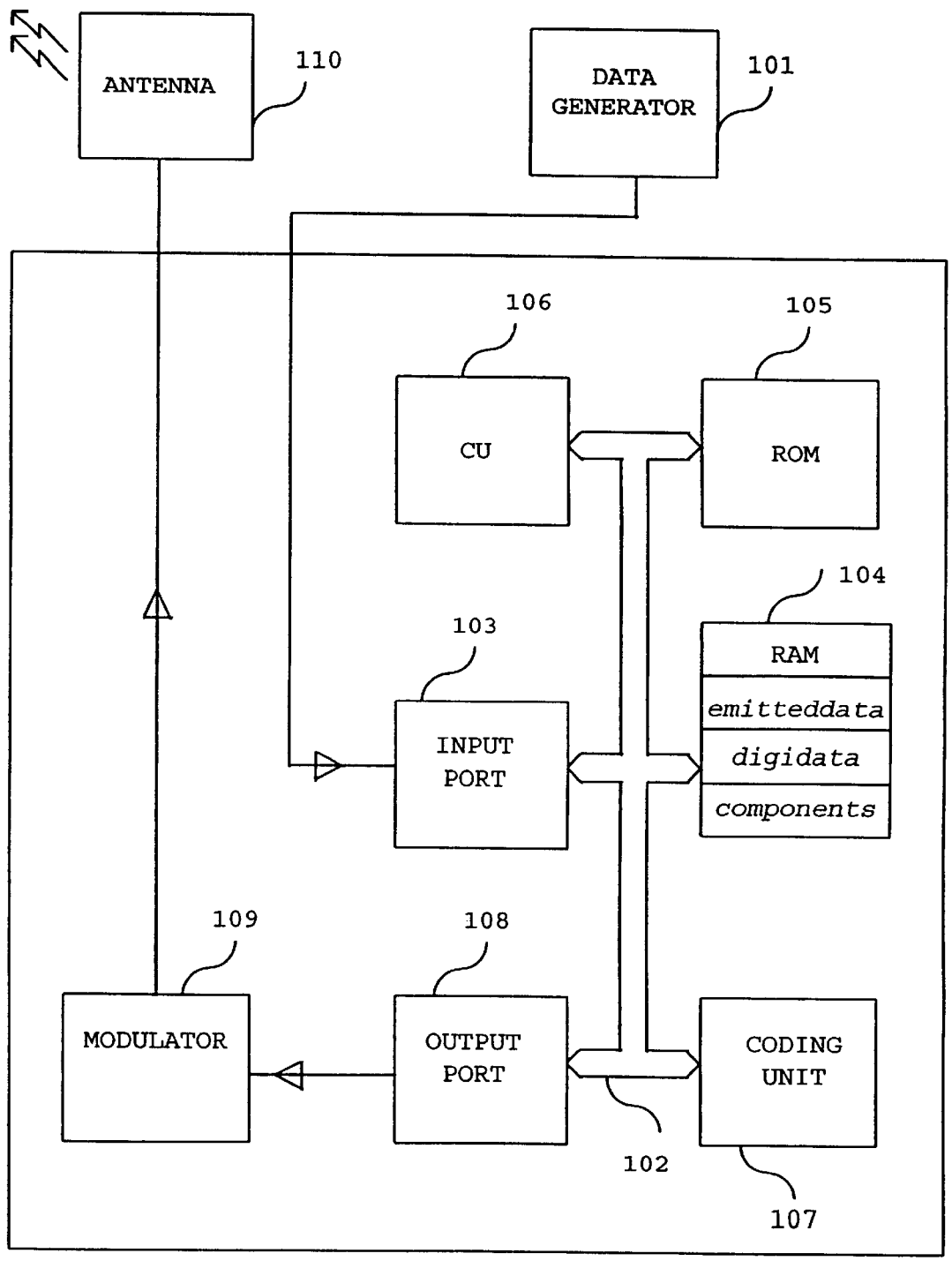
FIG. 1 illustrates an electronic block diagram of a transmission device according to the present invention.

FIG. 1 shows a digital data generator 101, and, interconnected by a bus 102:

an input port 103;

a random access memory 104;

a read-only memory 105;

a processing unit 106;

a coding unit 107;

an output port 108;

a modulator 109; and a transmission medium 110.

The digital data generator 101 may supply any symbols. It is, for example, composed of a transmitted data receiver, a data processing system, and a data memory. The digital data which it supplies may come from sensors of, for example a facsimile machine, electronic camera, microphones or readers of analog media, followed by analog to digital converters, as well as systems for storage, processing or synthesis of digital data. The data supplied by the digital data generator 101 are referred to as "to be transmitted" and belong to an alphabet having P symbols. In the example described and depicted, P is equal to $2^6$, that is to say 64, the data to be transmitted being formed from sextuples of binary data supplied on six parallel electrical connections ending at the input port 103.

The input port 103 supplies, at a rate given by the processing unit 106, the data to be transmitted to the processing unit 106, according to procedures known to persons skilled in the art of microprocessor data processing systems.

The bus 102 has eight data lines plus one or more lines carrying protocol or parity signals.

The random access memory 104 stores the symbols, data, parameters and intermediate results necessary for the operation of the transmission device as described below.

The read-only memory 105 stores the operating system of the processing unit 106 and the program allowing the operation of the transmission device described below.

The processing unit 106 is a microcontroller having a microprocessor, interfaces and memories, of known type.

The coding unit 107 is a component using a Reed-Solomon coding well known to persons skilled in the art, working on octets supplied in parallel on the bus 102. It has its own memories and processing circuits (not shown). By way of example, the coding unit is based on the use of the component manufactured by AHA (Advanced Hardware Architectures, Inc., Pullman, Wash., USA) under the reference AHA4011, which uses:

a Reed-Solomon code defined over the finite field $GF(2^8)$;

a field defining primitive polynomial $P(x)=x^8+x^7+x^2+x+1$, and a generator polynomial, dependent on the variable R, given by $G(x)$ which is equal to the product, from i=120 to i=119+R, of the polynoms $(x-\alpha^i)$, where $R \in \{2, 3, 4, \ldots, 20\}$.

(This polynomial is defined in international standards, Intelsat IESS 308 (Rev 6B), RTCA DO-217 Appendix F (Rev D) and the proposed CCITT SG-18)

For every two check bytes, the decoder can correct either two "erasures" or one "error". An "erasure" is an error with a known location. This could be determined with a parity detector or a signal dropout detector, for example. An erasure is indicated by the ERASE signal when the erase byte is clocked in the device. Errors are defined as erroneous bytes whose locations are unknown, i.e., there was no corresponding ERASE input for these bytes. Correcting "erasures" takes only half as much of the correction capability of the RS code as it takes to correct "errors", since the position information is already known for "erasures". The correction ability of the code is bounded as:

$R \geq$ number of "erasures"+twice the number of "errors".

Valid block length (N) is defined by the relationship: $R+1 \leq N \leq 255$, where R range from 2 to 20. A complete codeword can therefore range from a minimum of 3 bytes to a maximum of 255 bytes.

Other equivalent components are marketed by LSI LOGIC® or COMATLAS.

The output port 108 supplies, at a rate given by the processing unit 106, sextuples to the modulator 109, according to procedures known to persons skilled in the art of microprocessor data processing systems.

The modulator 109 is a modulator performing amplitude modulation in accordance with two carriers in quadrature with 64 states, a modulation known under the names QAM-64 and 64-QAM, which will be used indiscriminately below to designate it.

Figure 3:
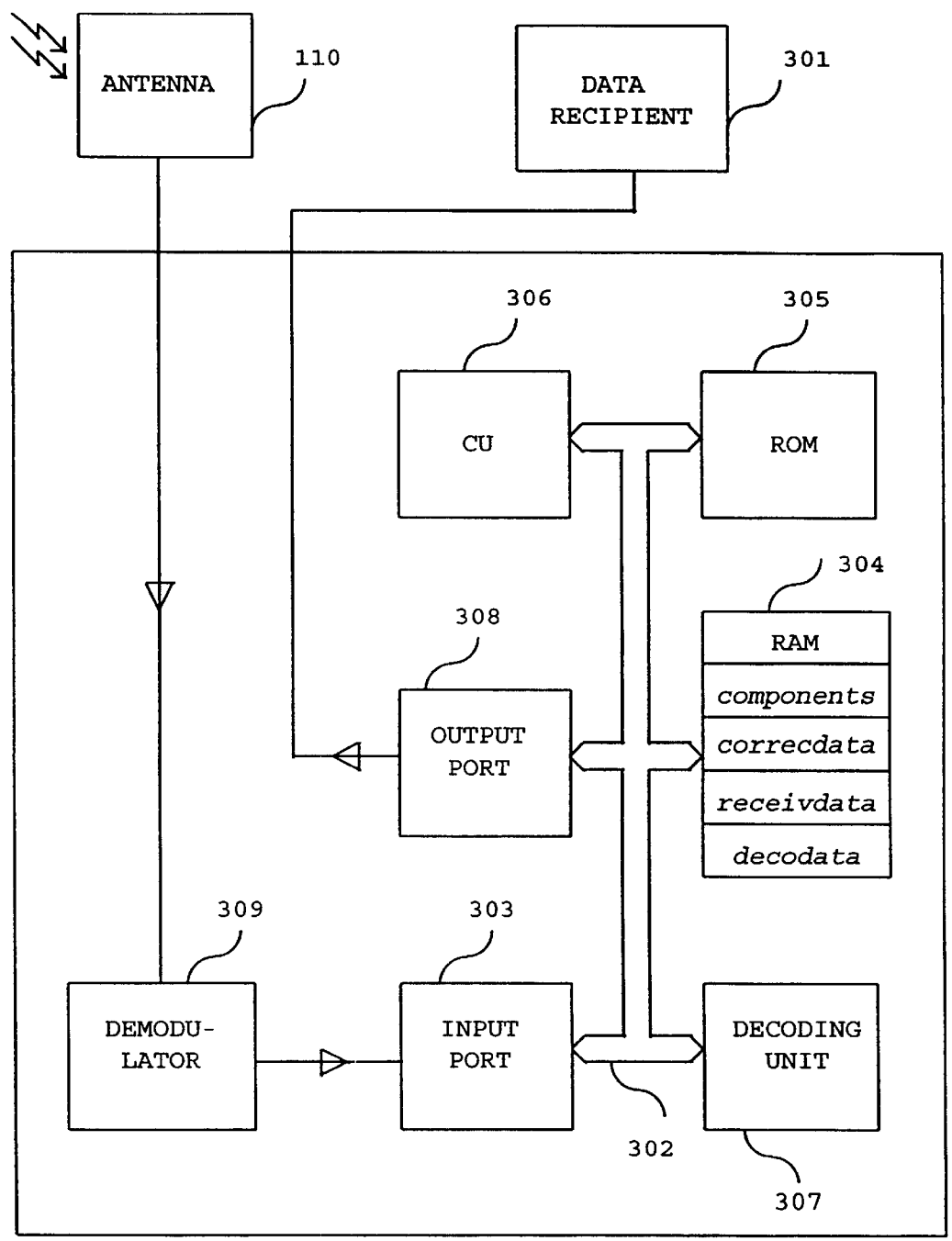
FIG. 3 illustrates a block diagram of a receiving device according to the present invention.

The transmission medium 110 is here composed of:

a radio transmitter having a means for transposition to a certain transmission frequency of the signal leaving the modulator 109 and a transmission power control means, a transmitting antenna transmitting electromagnetic waves, the components of which represent amplitudes modifying the two carriers in quadrature which are modulated by the modulator 109, the transmission space in which the electromagnetic waves move, and elements which are presented with reference to FIG. 3 and which concern the reception of waves which move in the transmission space.

It should be noted that each type of transmission medium carries noise capable of affecting with errors the symbols, data or information (here the component couples) resulting from demodulation of the signals which this medium carries.

The operation of each of the elements illustrated in FIG. 1 is detailed below.

FIG. 2 shows:

the digital data generator 101, a labelling means 202, composed of the processing unit 106 and the memories 104 and 105, which is adapted to receive so-called "to be transmitted" digital data items belonging to an alphabet having P symbols (here 64), and to map each digital data item to be transmitted to symbols to be coded, with Q (here equal to 256) strictly greater than P, P symbols of the second alphabet each representing exclusively one and only one symbol of the first alphabet. In the embodiment described and depicted, the labelling means is adapted to add predetermined digital data (here binary zero values) to each symbol of the first alphabet in order to form a secondary digital data item belonging to the second alphabet which corresponds to the said symbol of the first alphabet;

a coding means 203, composed of the coding unit 107, which is adapted to receive so-called "to be coded" symbols of the alphabet having a number Q symbols and to supply to the preselection means so-called "redundant" symbols of the alphabet having a number Q of symbols, capable of allowing the correction of errors affecting symbols to be coded, the symbols to be transmitted having the redundant symbols. In the embodiment described and shown, the coding means uses a Reed-Solomon coding;

a preselection means 204, composed of the processing unit 106 and the memories 104 and 105, which is adapted to receive so-called "to be transmitted" symbols of an alphabet having a number Q of symbols and to supply, to the selection means, digital data able to take P different values, P being less than Q. In the embodiment described and depicted, the preselection means is adapted to receive symbols to be transmitted each capable of being represented by a sequence of binary data and to supply, to the selection means, digital data items each representing segments of the sequences;

a selection means 205, composed of the processing unit 106 and the memories 104 and 105, which is adapted to select certain digital data couples which follow one another in the series of digital data, using cyclic predetermined so-called "selection" rules, that is to say the selection rules use a so-called "selection cycle" number, two digital data items separated by an integer number of selection cycles being selected in an identical manner by the selection means;

a mapping means 206, composed of the processing unit 106 and the memories 104 and 105, which is adapted to map, according to a set of predetermined rules, each selected digital data couple to an amplitude couple. The set of predetermined rules includes the first rule according to which, when an estimated probability that two amplitude couples are confused after the transmission is greater than a first predetermined value, then the digital data couples corresponding to the two amplitude couples have first or second digital data items of the same value and the second rule according to which, for a predetermined proportion of the pairs of amplitude couples for which the estimated probability that the couples are confused after transmission is greater than a second predetermined value and less than the first predetermined value, then the digital data couples corresponding to the two amplitude couples have first or second digital data items of the same value (the predetermined proportion corresponding to 74 of 98 pairs of amplitude couples considered). The mapping means is adapted to use cyclic predetermined so-called "mapping" rules, that is to say the mapping rules use a so-called "mapping cycle" number, two equal couples (i.e., identical couples) separated by an integer number of mapping cycles being mapped to the same amplitude couple;

a transmission means 207, composed of the modulator 109, which is adapted to perform the transmission, on the transmission medium, of a signal in quadrature, with its components being respectively modified by the first and second amplitudes of the amplitude couples supplied by the mapping means. In the embodiment described and depicted, the transmission means is adapted to perform the transmission of a signal which is amplitude modulated in accordance with two carriers in quadrature with 64 states; and the transmission medium 110.

FIG. 3 shows a digital data recipient 301, and, interconnected by a bus 302:

an input port 303;
a random access memory 304;
a read-only memory 305;
a processing unit 306;
a decoding unit 307;
an output port 308;
a demodulator 309; and
the transmission medium 110.

The digital data recipient 301 is, for example, composed of a transmitter of transmitted data, a data processing system, and a data memory. It may also have digital to analog conversion means and means for displaying images, text or graphics, or for modulation of physical quantities and/or for processing and storage of data in analog or digital form. The symbols supplied to the data recipient 301, by means of the output port 308, are known as "transmitted digital data" and belong to an alphabet having P symbols. They are generally identical to the data "to be transmitted" supplied by the digital data generator 101 of the transmission device (FIG. 1) and are therefore made up of sextuples of binary data supplied on six parallel electrical connections from the output port 308.

The input port 303 supplies, at a rate given by the processing unit 306, symbols known as "component couples", coming from the demodulator 309, to the processing unit 306, according to procedures known to persons skilled in the art of microprocessor data processing systems.

The bus 302 has eight data lines plus one or more lines carrying protocol or parity signals.

The random access memory 304 stores the symbols, data, parameters and intermediate results necessary for the operation of the transmission device as described below.

The read-only memory 305 stores the operating system of the processing unit 306 and the program allowing the operation of the transmission device described below.

The processing unit 306 is a microcontroller having a microprocessor, interfaces and memories, of known type.

The decoding unit 307 is a component using a Reed-Solomon decoding well known to persons skilled in the art, working on octets supplied in parallel on the bus 302. It has its own memories and processing circuits (not shown). By way of example, the decoding unit is based on the use of the component manufactured by AHA (Advanced Hardware Architectures, Inc., Pullman, Wash., USA) under the reference AHA 4011.

The output port 308 supplies, at a rate given by the processing unit 306, sextuples to the data recipient 301, according to procedures known to persons skilled in the art of microprocessor data processing systems.

The demodulator 309 is a demodulator performing amplitude demodulation in accordance with two carriers in quadrature with 64 states.

The transmission medium 110 has the elements presented above with reference to FIG. 1, and:

a receiving antenna (not shown) receiving the electromagnetic waves coming from the transmitting antenna, and a radio receiver having a means for transposition to a certain receiving frequency of the signal leaving the receiving antenna, a gain control means and means for synchronization, notably of frame and phase.

The transmission medium 110 thus supplies a wave of standardized amplitude to the demodulator 309.

The operation of each of the elements illustrated in FIG. 3 is detailed below.

FIG. 4 shows:

the transmission medium 110.

a receiving means 401, composed of the demodulator 309, which is adapted to perform the reception of signals carried by the transmission medium and to supply component couples representing amplitudes in phase and in phase quadrature of the said signals. In the embodiment described and shown, the receiving means is adapted to receive a signal which is amplitude modulated in accordance with two carriers in quadrature with 64 states and to supply the component couple of the signal to the sorting means;

a sorting means 402, composed of the processing unit 306, the read-only memory 305 and the random access memory 304, is adapted to select certain so-called "sorted" component couples using cyclic predetermined so-called "sorting" rules, that is to say the sorting rules use a so-called "sorting cycle" number, two digital data items separated by an integer number of sorting cycles being sorted in an identical manner by the sorting means;

a matching means 403, composed of the processing unit 306, the read-only memory 305 and the random access memory 304, is adapted to match, according to a set of predetermined so-called "matching" rules, each sorted component couple, with a so-called "received" digital data couple. The set of predetermined matching rules includes the first rule according to which, when an estimated probability that two signals having two component couples are confused after the reception is greater than a first predetermined value, then the received digital data couples corresponding to the two component couples have first or second digital data items of the same value and the second rule according to which, for a predetermined proportion of pairs of component couples for which the estimated probability that the couples are confused after transmission is greater than a second predetermined value and less than the first predetermined value, then the received digital data couples corresponding to the two component couples have first or second digital data items of the same value. The matching means is adapted to use cyclic matching rules, that is to say the matching rules use a so-called "matching cycle" number, two equal couples separated by an integer number of matching cycles being mapped to the same component couple;

an identification means 404, composed of the processing unit 306, the read-only memory 305 and the random access memory 304, is adapted to receive received digital data belonging to an alphabet having P symbols, and to map received digital data to so-called "to be decoded" symbols belonging to an alphabet having Q symbols, with Q strictly greater than P;

a decoding means 405, composed of the decoding unit 307, is adapted to receive so-called "to be decoded" symbols of the alphabet having a number Q of symbols and to supply so-called "corrected" symbols of the said alphabet having a number Q of symbols, using correction rules and so-called "redundant" symbols to be decoded. In the embodiment described and shown, the decoding means uses a Reed-Solomon decoding;

a translation means 406, composed of the processing unit 306, the read-only memory 305 and the random access memory 304, is adapted to receive the corrected symbols and to supply so-called "transmitted" digital data belonging to an alphabet having P symbols. In the embodiment described and shown, the translation means is adapted to receive corrected symbols each capable of being represented by a sequence of binary data and to supply transmitted digital data items each representing segments of the sequences, by removing predetermined digital data from each corrected symbol in order to form a transmitted digital data item and the digital data recipient 301.

Figure 5A:
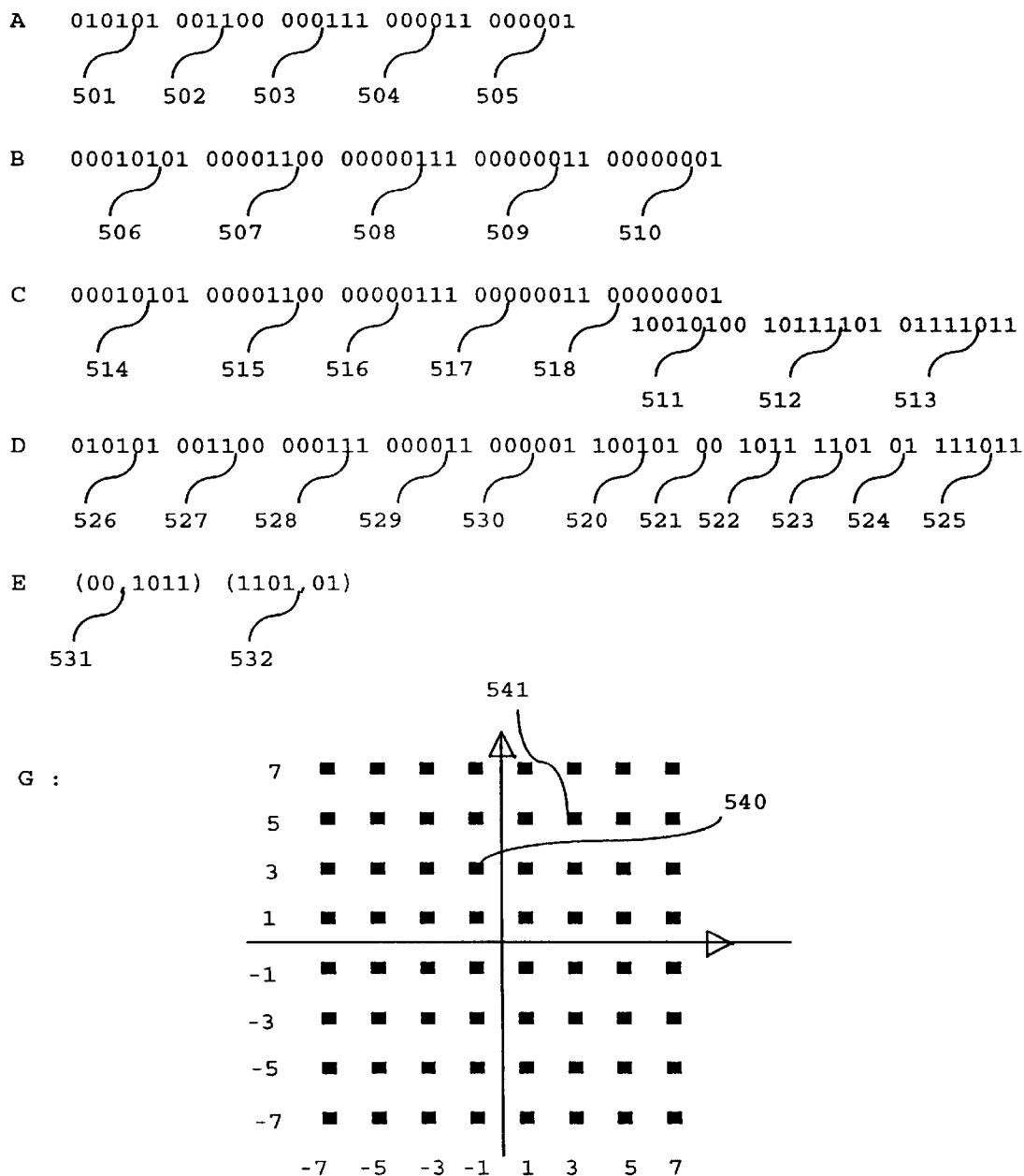
FIGS. 5A and 5B illustrate formats of data transmitted using the present invention.

FIG. 5A shows successively the forms taken by a segment of a series of symbols transmitted from the digital data generator 101 to the transmission medium 110.

In line A, the data to be transmitted have the form of sextuples of binary data, referenced 501, 502, 503, 504 and 505. They are the digital data supplied by the digital data generator 101 to the input port 103.

In line B, the data to be transmitted are represented, after processing by the labelling means 202, by symbols to be coded, referenced 506, 507, 508, 509 and 510, which are octets in which the two most significant bits all have the same predetermined value, here equal to zero, and the six least significant bits are the six bits of the sextuples of the data to be transmitted.

In line C, the symbols to be coded correspond, after coding by the coding means 203, on the one hand, to redundant symbols referenced 511, 512 and 513, which are octets capable of allowing the correction of errors affecting the symbols to be coded and, on the other hand, to octets, referenced 514, 515, 516, 517 and 518, which are respectively equal to the symbols to be coded 506, 507, 508, 509 and 510.

The redundant symbols and the symbols to be coded are jointly known as "symbols to be transmitted". They are transmitted to the preselection means 204.

In line D, it can be seen that the preselection means has replaced:

on the one hand, the three octets forming the redundant symbols 511, 512 and 513 by the digital data 520, 521, 522, 523, 524 and 525, composed respectively of:
the six most significant bits of the first octet 511,
the two least significant bits of the first octet 511,
the four most significant bits of the second octet 512,
the four least significant bits of the second octet 512,
the two most significant bits of the third octet 513 and
the six least significant bits of the third octet 513, and on the other hand, the octets, referenced 514, 515, 516, 517 and 518, by the sextuples 526, 527, 528, 529 and 530, which are respectively equal to the sextuples of data to be transmitted 501 to 505.

It can be seen in line E that the selection means supplies couples made up of successive digital data items which are not sextuples. The other digital data items are not selected by the selection means.

The selected digital data couples 531 and 532 are thus composed
to form the couple 531, of the digital data 521 corresponding to the two least significant bits of the octet 511 representing the first redundant symbol and the digital data 522 corresponding to the four most significant bits of the octet 512 representing the second redundant symbol,
to form the couple 532, of the digital data 523 corresponding to the four least significant bits of the octet 512 representing the second redundant symbol and the digital data 524 corresponding to the two most significant bits of the octet 513 representing the third redundant symbol.

In Table 1, below, mapping rules applied to the digital data couple 531 can be seen: the numbers of the lines and columns in Table 1 are equal to amplitudes. Each amplitude couple thus corresponds to a value in the table equal, to the base 4:
for the first digit, to the first digital data item of the couple 531, that is 00 in binary and 0 to the base 4, and
for the last two digits, to the second digital data item of the couple 531, that is respectively 10 and 11 in binary and 2 and 3 to the base 4.

It should be noted that the couple 531, represented by the value 023 to the base 4, is associated with the amplitudes −1 et +3, respectively associated with the signal in phase and the signal in phase quadrature (amplitudes corresponding to the point 540 in the set of points shown in line G).

TABLE 1

| line | column | | | | | | | |
|---|---|---|---|---|---|---|---|---|
| | -7 | -5 | -3 | -1 | 1 | 3 | 5 | 7 |
| 7 | 000 | 010 | 030 | 020 | 120 | 130 | 110 | 100 |
| 5 | 001 | 011 | 031 | 021 | 121 | 131 | 111 | 101 |
| 3 | 003 | 013 | 033 | 023 | 123 | 133 | 113 | 103 |
| 1 | 002 | 012 | 032 | 022 | 122 | 132 | 112 | 102 |
| -1 | 202 | 212 | 232 | 222 | 322 | 332 | 312 | 302 |
| -3 | 203 | 213 | 233 | 223 | 323 | 333 | 313 | 303 |
| -5 | 201 | 211 | 231 | 221 | 321 | 331 | 311 | 301 |
| -7 | 200 | 210 | 230 | 220 | 320 | 330 | 310 | 300 |

It can be seen that the mapping means maps, according to a set of predetermined rules, each selected digital data couple to an amplitude couple, the set of predetermined rules including at least the first rule according to which, when an estimated probability that two amplitude couples are confused after the transmission is greater than a first predetermined value, then the digital data couples corresponding to the two amplitude couples have first or second digital data items of the same value.

Furthermore, the set of predetermined rules includes the second rule according to which, for a predetermined proportion of the pairs of amplitude couples for which the estimated probability that the couples are confused after transmission is greater than a second predetermined value and less than the first predetermined value, then the digital data couples corresponding to the two amplitude couples have first or second digital data items of the same value. In the embodiment described and shown, the predetermined proportion corresponds to 74 of 98 pairs of amplitude couples considered.

Finally it can be seen that:

the selection means uses cyclic predetermined selection rules, that is to say the mapping rules use a so-called "selection cycle" number, two digital data items separated by an integer number of selection cycles being selected in an identical manner by the selection means, and that the mapping means uses cyclic predetermined mapping rules, that is to say the mapping rules use a so-called "mapping cycle" number, two equal couples separated by an integer number of mapping cycles being mapped to the same amplitude couple.

In Table 2, below, mapping rules applied to the digital data couple 532 can be seen: the numbers of the lines and columns in Table 1 are equal to amplitudes. Each amplitude couple thus corresponds to a value in the table equal, to the base 4:

for the first two digits, to the first digital data item of the couple 532, that is 11 and 01 in binary and 3 and 1 to the base four, and for the last digit, to the second digital data item of the couple 532, that is 01 in binary and 1 to the base four.

TABLE 2

| line | column | | | | | | | |
|---|---|---|---|---|---|---|---|---|
| | -7 | -5 | -3 | -1 | 1 | 3 | 5 | 7 |
| 7 | 000 | 100 | 300 | 200 | 201 | 301 | 101 | 001 |
| 5 | 010 | 110 | 310 | 210 | 211 | 311 | 111 | 011 |
| 3 | 030 | 130 | 330 | 230 | 231 | 331 | 131 | 031 |
| 1 | 020 | 120 | 320 | 220 | 221 | 321 | 121 | 021 |

TABLE 2-continued

| line | column | | | | | | | |
|---|---|---|---|---|---|---|---|---|
| | -7 | -5 | -3 | -1 | 1 | 3 | 5 | 7 |
| -1 | 022 | 122 | 322 | 222 | 223 | 323 | 123 | 023 |
| -3 | 032 | 132 | 332 | 232 | 233 | 333 | 133 | 033 |
| -5 | 012 | 112 | 312 | 212 | 213 | 313 | 113 | 013 |
| -7 | 002 | 102 | 302 | 202 | 203 | 303 | 103 | 003 |

It can be seen that the couple 532, represented by the value 311 to the base 4, is associated with the amplitudes +3 and +5 respectively associated with the signal in phase and the signal in phase quadrature (amplitudes corresponding to the point 541 of the set of points shown in line G).

Line G shows the amplitude couples mapped, by the mapping means 206, with, on the one hand, the sextuples 526 to 530 and, on the other hand, the selected couples, in the form, well known to persons skilled in the art, of a set of points, that is to say a representation in which each couple is represented by a point in a plane, the first term of the couple being used for the X-axis and the second term being used for the Y-axis. This set of points is a set of points for the QAM-64 modulation.

It should be noted here that, according to the most commonly used theoretical error probability estimation model, the probabilities of error, that is to say of confusion with another component couple, affecting a component couple, are estimated, by persons skilled in the art, as being a monotonic decreasing function of the Euclidean distance between the points representing these couples in the QAM-64 set of points. More precisely, this probability of error between two component couples is inversely proportional to the square of this Euclidean distance.

The result of this commonly accepted theoretical probability estimation is that there is:

a first predetermined value, such that, when an estimated probability that two component couples are confused is greater than this first predetermined value, these two couples are immediately adjacent, that is to say they have either first or second identical components (they are adjacent on a line or a column of the set of points) and, respectively, either second, or first components which only differ from one another by an elementary unit (a unit corresponding to a difference in amplitude of two, in this case);

a second predetermined value, such that, when an estimated probability that two component couples are confused is greater than this second predetermined value, if these two couples are not immediately adjacent, their first components differ by only one elementary unit and their second component differs by only one elementary unit.

For other transmission media and/or for other theoretical models, for which these probabilities of error between component couples could be different, the values are consequently chosen from the tables for mapping between amplitude couples and digital data.

Figure 5B:
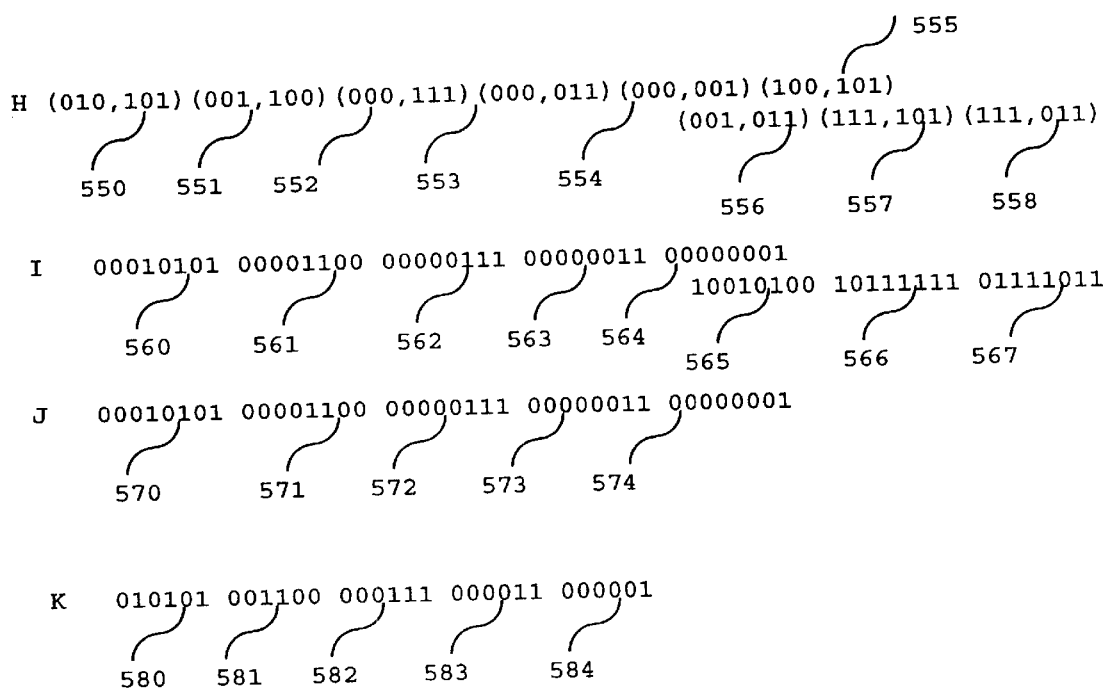

FIG. 5B shows the forms taken by a segment of a series of symbols transmitted from the transmission medium 110 to the digital data recipient 301.

Line H shows the so-called "received" digital data couples supplied to the identification means 404 by the matching means 403. These digital data are referenced 550, 551, 552, 553, 554, 555, 556, 557 and 558.

For explanatory purposes, it has been assumed that the second couple 532 had, after transmission and reception, been affected by an error, that is to say that instead of corresponding to the amplitudes +3 and +5, it was considered to correspond to the amplitudes +3 and +3, these two amplitude couples being immediately adjacent in the QAM-64 set of points.

These amplitude couples are respectively linked, by Table 2, which is used, both in the transmission device and in the receiving device, for the second couple 532, to the values 311 and 331 which are immediately adjacent in Table 2 and which correspond to the component couples (110,101) and (111,101), in binary.

It should be noted here that only one of these two values corresponding, on the one hand, to the first four binary values and, on the other hand, to the last two binary values, has been modified, by virtue of the use of the predetermined mapping rules explained above (with reference to Table 1).

When these rules are not used, some of the most probable errors correspond to a component couple modification such that simultaneously the said two values could have been modified.

Line I shows the values of the so-called "to be decoded" symbols supplied by the identification means 404 to the decoding means 405. These symbols to be decoded, 560, 561, 562, 563, 564, 565, 566 and 567, are octets. They are made up respectively:

for the first five octets, of the six binary values of each received digital data couple, taken in the order of their appearance in the digital data of this couple, binary values to which two binary value "0"s are added to form the two most significant binary values, for the octet 565, of the six binary values of the couple 555, taken in the order of their appearance in the digital data of this couple 555, to form the six most significant binary values of the octet 565, and the first two binary values of the first digital data item of the couple 556, to form the two least significant binary values of the octet 565, for the octet 566, of the last four binary values of the couple 556, taken in the order of their appearance in the digital data of this couple 556, to form the four most significant binary values of the octet 566, and the first four binary values of the digital data of the couple 557, to form the four least significant binary values of the octet 566, and for the octet 567, of the last two binary values of the couple 557, taken in the order of their appearance in the digital data of this couple 557, to form the two most significant binary values of the octet 567, and the six binary values of the digital data of the couple 558, to form the six least significant binary values of the octet 567.

Line J shows the corrected symbols supplied by the decoding means 405 to the translation means 406, referenced 570, 571, 572, 573 and 574. In order to perform the processing for decoding, that is to say in this case for error correction, the decoding means 405 uses the last three symbols to be decoded as redundant symbols capable of allowing the correction of errors affecting the first five symbols to be decoded. The decoding means here uses a Reed-Solomon decoding.

The first corrected symbol therefore has a value equal to that of the symbol to be coded 506, its third binary symbol, which was equal to "1" on line I, after correction taking the value "0".

Line K shows the transmitted digital data, referenced 580, 581, 582, 583 and 584, supplied by the translation means 406 to the digital data recipient 301, and respectively equal to the six least significant binary values of the corresponding octets in line J.

Figure 2:
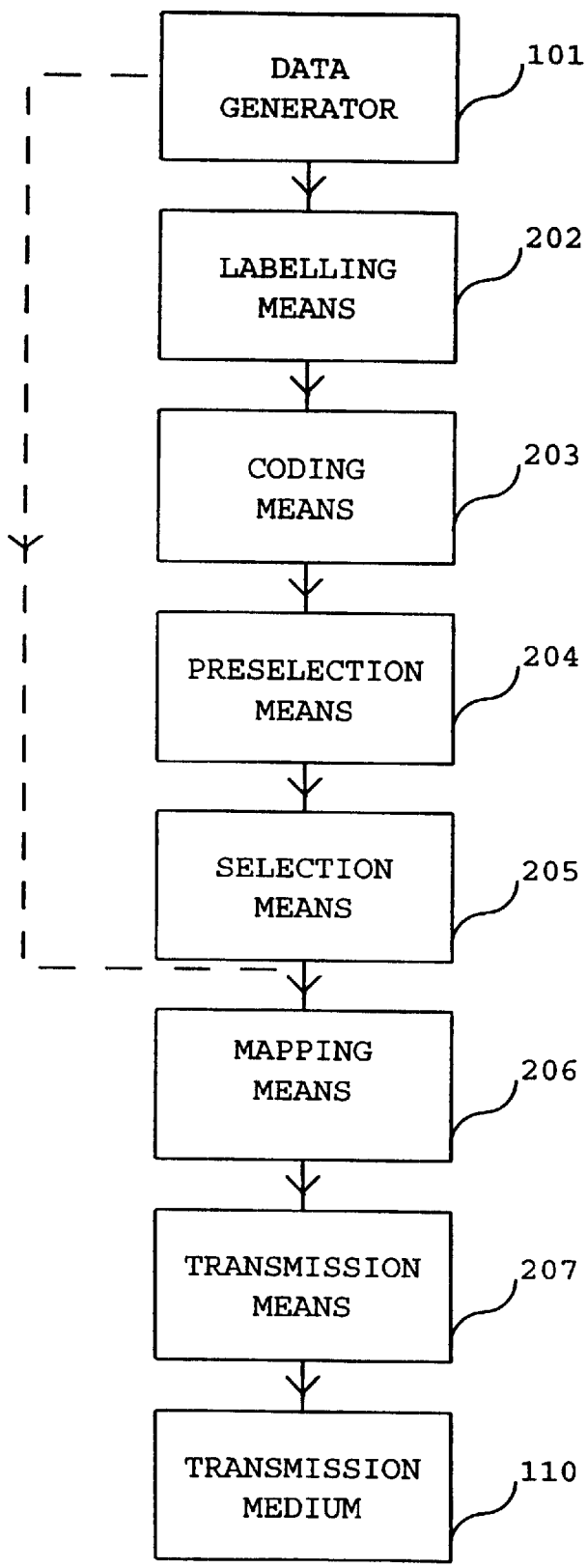
FIG. 2 illustrates a functional diagram of the transmission device illustrated in FIG. 1.
Figure 6:
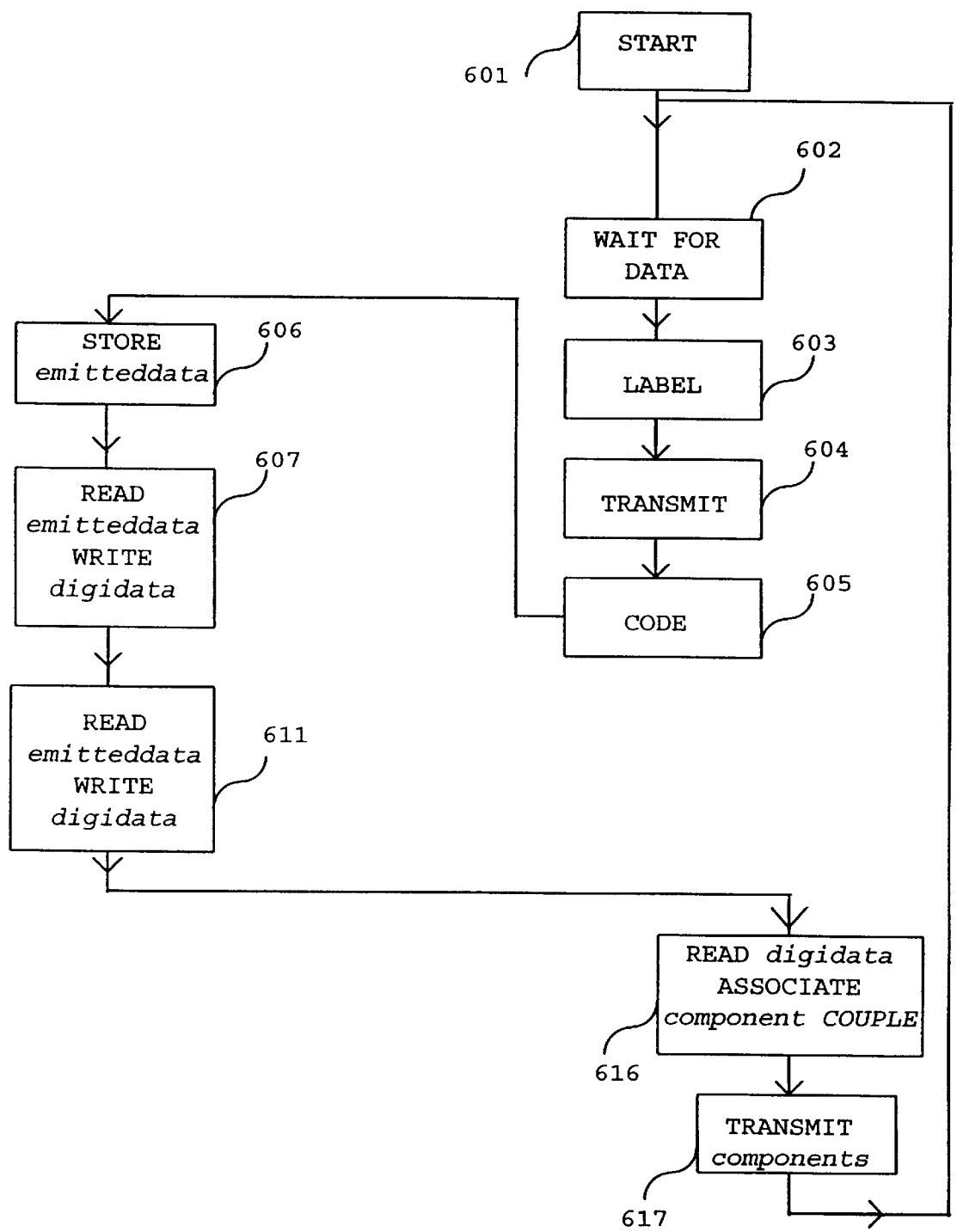
FIG. 6 shows an operational flow diagram of the transmission device illustrated in FIGS. 1 and 2.

FIG. 6 shows an operational flow diagram of the transmission device illustrated in FIGS. 1 and 2. After the start 601 of the transmission device, the operation 602 consists of waiting until five data items to be transmitted are supplied by the data generator 101.

Next, the processing unit 106 carries out the operation 603, which consists, for the labelling means, of labelling the data to be transmitted as explained above (FIG. 5).

Next, the operation 604 consists of transmitting the symbols to be coded coming from the labelling means to the coding unit 107. The operation 605 consists of the coding of the symbols to be coded, by the coding unit 107, which then supplies redundant symbols.

The operation 606 consists of storing, by the preselection means 204, of symbols to be transmitted, composed of symbols to be coded and redundant symbols, in a register "emitteddata" of the random access memory 104. The register "emitteddata" is of a type known to persons skilled in the art under the name FIFO ("First In, First Out"), that is to say in this register:

each write causes the movement of a pointer for writing into the register, the reads are made in the same order as the writes, and each read causes the movement of a pointer for reading from the register.

The operation 607 consists of reading, from the register "emitteddata", five symbols to be transmitted and of storing the six least significant bits of each symbol to be transmitted in one position of a register "digidata" of the random access memory 104, this register also being of FIFO type.

It should be noted here that the five symbols to be transmitted considered in the operation 607 are, in fact, the five symbols to be coded coming from the coding means 203.

The operation 611 consists of reading, from the register "emitteddata", three symbols to be transmitted and of storing successively in the register "digidata"

a digital data item composed of the six most significant bits of the first symbol to be transmitted, a digital data item composed of the two least significant bits of the first symbol to be transmitted, and the four most significant bits of the second symbol to be transmitted, a digital data item composed of the four least significant bits of the second symbol to be transmitted, and the two most significant bits of the third symbol to be transmitted, a digital data item composed of the six least significant bits of the third symbol to be transmitted.

It should be noted here that the three symbols to be transmitted considered in the operation 611 are, in fact, the three redundant symbols generated by the coding means 203.

The operation 616 consists of:

reading, from the register "digidata", six digital data items, respectively mapping to them components of an amplitude couple, with mapping rules which are immaterial, and storing the six amplitude couples in a register "components" of the random access memory 104, this register also being of FIFO type, reading, from the register "digidata", a digital data item, associating with it, using Table 1, an amplitude couple and storing this amplitude couple in the register "components", reading, from the register "digidata", a digital data item, associating with it, using Table 2, an amplitude couple and storing this amplitude couple in the register "components", and reading, from the register "digidata", a digital data item, mapping to it, with mapping rules which are immaterial, components of an amplitude couple, and storing the amplitude couple in the register "components".

For reasons of simplicity, the mapping rules are alternately composed of the mapping rules illustrated by Table 1 and the mapping rules illustrated by Table 2. The mapping rules are thus cyclic.

Finally, the operation 617 consists of:

reading, in pairs, the values, which in fact form component couples, from the register "components" and performing, using the modulator 109, the modulation of a signal in QAM-64 having the said component couples.

Following the operation 617, the operation 602 is repeated.

Figure 4:
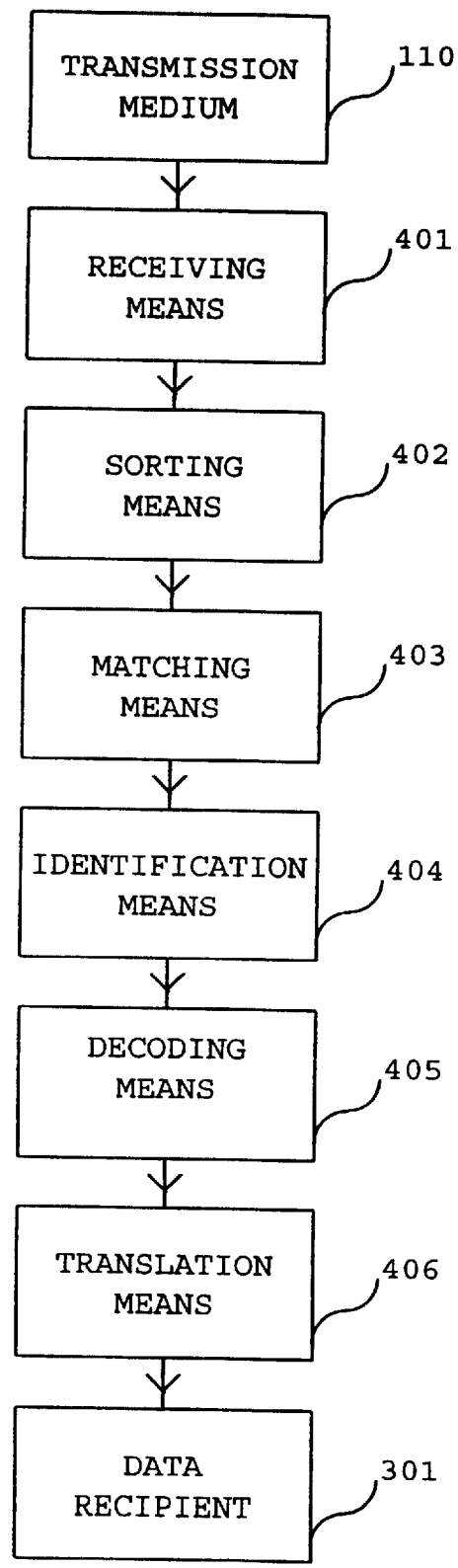
FIG. 4 illustrates a functional diagram of the receiving device illustrated in FIG. 3.
Figure 7:
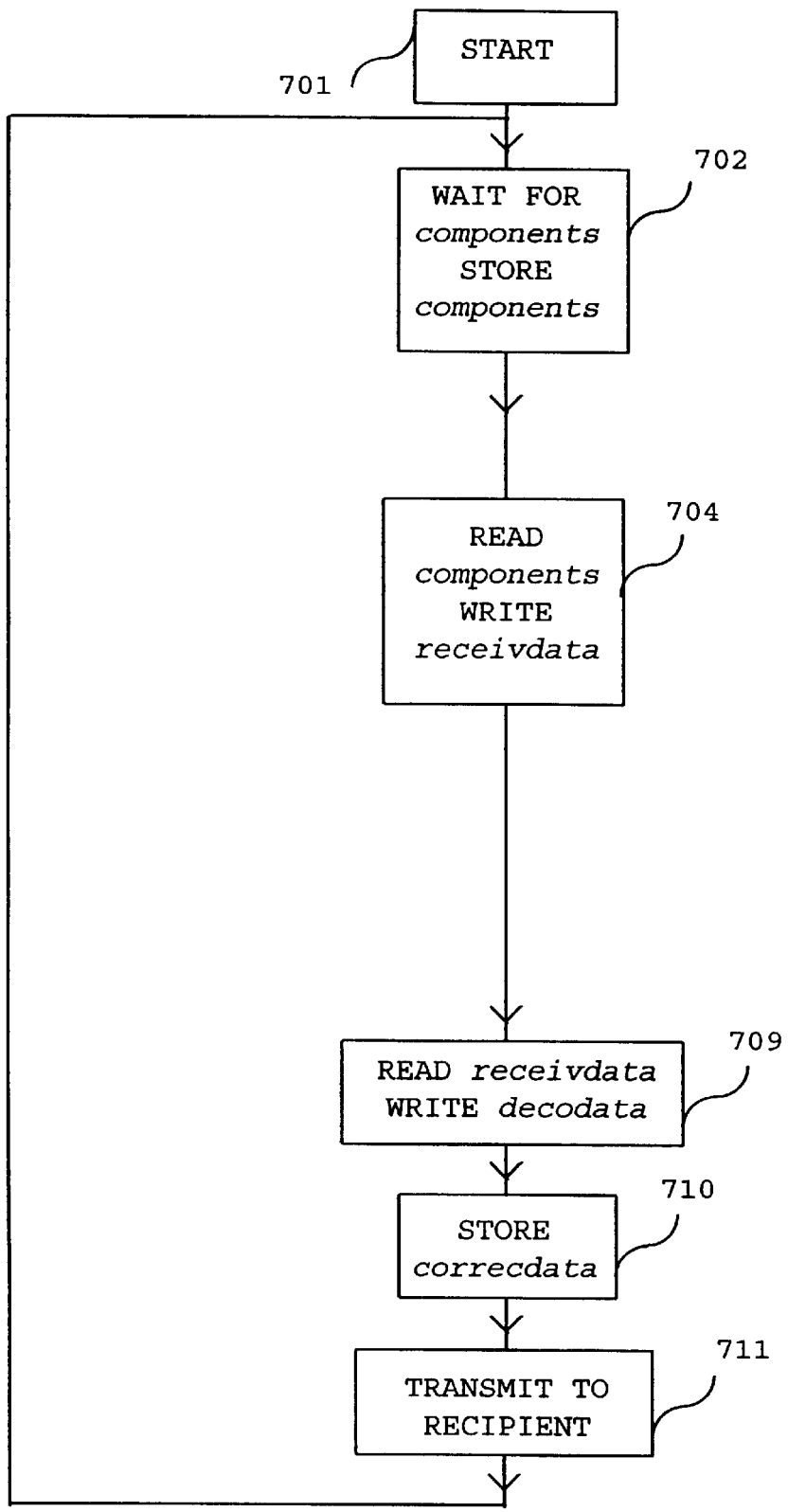
FIG. 7 shows an operational flow diagram of the receiving device illustrated in FIGS. 3 and 4.

FIG. 7 shows an operational flow diagram of the receiving device presented with reference to FIGS. 3 to 5.

After the start 701, the operation 702 consists of waiting for nine component couples supplied by the demodulator 309 and of storing the eighteen components received in this way in a register "components" of the random access memory 304, this register operating as a FIFO.

The operation 704 next consists of:

reading six successive component couples from the register "components", associating a sextuple with each couple with mapping rules the inverse of the rules respectively used during the operation 616, for the first six digital data items, and storing the sextuples in a register "receivdata" of the random access memory 304, the said register itself also operating as a FIFO, reading a new component couple from the register "components" and writing into the register "receivdata" the sextuple formed from the digital values which correspond, by means of Table 1, to the received component couple, reading another component couple from the register "components", and writing into the register "receivdata" the sextuple formed from the digital values which correspond, by means of Table 2, to the received component couple, and reading a last component couple from the register "components", associating with it a sextuple with mapping rules the inverse of the rules respectively used during the operation 616, for the last digital data item, and storing the sextuple in the register "receivdata".

The operation 709 consists of:

reading five sextuples from the register "receivdata", adding two zero most significant bits to each sextuple read in order to form octets, and writing the result into a register "decodata", and reading four sextuples from the register "receivdata" to form:

a first octet taking as most significant bits the six bits of the first sextuple and, as least significant bits, the two most significant bits of the second sextuple, a second octet taking as most significant bits the four remaining bits of the second sextuple and, as least significant bits, the four most significant bits of the third sextuple, and a third octet taking as most significant bits the two remaining bits of the third sextuple and, as least significant bits, the six bits of the third sextuple.

It should be noted here that the octets composed in this way correspond to the symbols to be decoded 560 to 567, described with reference to line I of FIG. 5B.

The operation 710 consists of transmitting to the decoding unit 307 the values stored in the register "decodata", receiving from the decoding unit 307 corrected symbols, and storing them in a register "correcdata" of the random access memory 304.

Finally, the operation 711 consists of reading each corrected symbol, removing the two most significant binary values from it, and supplying the resulting sextuple to the digital data recipient 301. Next, the operation 702 is repeated.

According to a number of variants of the present invention, it is arranged that each redundant octet is transmitted over two QAM-64 symbols independent of the other symbols: for example a redundant octet may be divided into 2+6 bits or into 2 times 4 bits. In this first variant, if a QAM-64 symbol contains only 0<n<6 redundant bits, there are a number of possibilities:

the remaining (6−n) bits are used to insert an error detecting or correcting code or any other useful information (label, protocol information, encryption, etc)

it is arranged that the spacing properties for the symbols connected with redundancy are improved by using only a sub-set of points of the initial QAM-64 set of points: for example, a good configuration consists of coding the redundant octets into two times 4 bits and using a QAM-16 modulation, a sub-set of points of the initial set of points. An example of a set of points is illustrated in FIG. 8.

Figure 8:
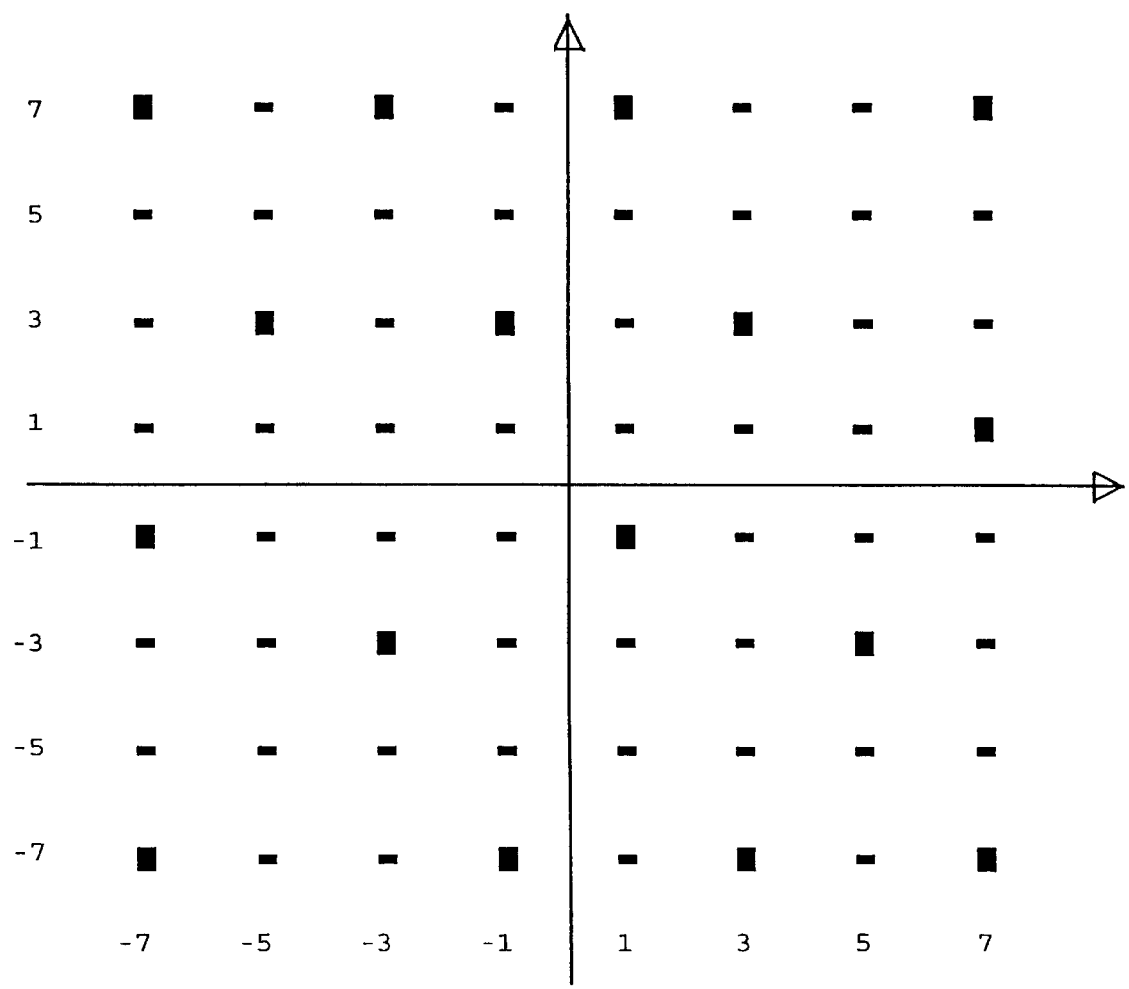
FIG. 8 illustrates a set of points used in one variant of the invention.

It can be seen, in FIG. 8, that certain values of amplitude couples (or component couples) of the QAM-64 signal are not used in this variant. These so-called "forbidden" values (represented by a light point) are arranged in such a way that two used component couples can be neither so-called "immediate", neighbors (that is to say with a first common component and second components which differ by only one unitary value, in this case equal to 2), nor so-called "quite close" neighbors (that is to say the first components of which differ by only one unitary value and the second components of which differ by only one unitary value).

It should be noted that the transmitting and receiving devices according to the present invention are preferentially implemented in the form of electronic circuits operating in real time.

Figure 9:
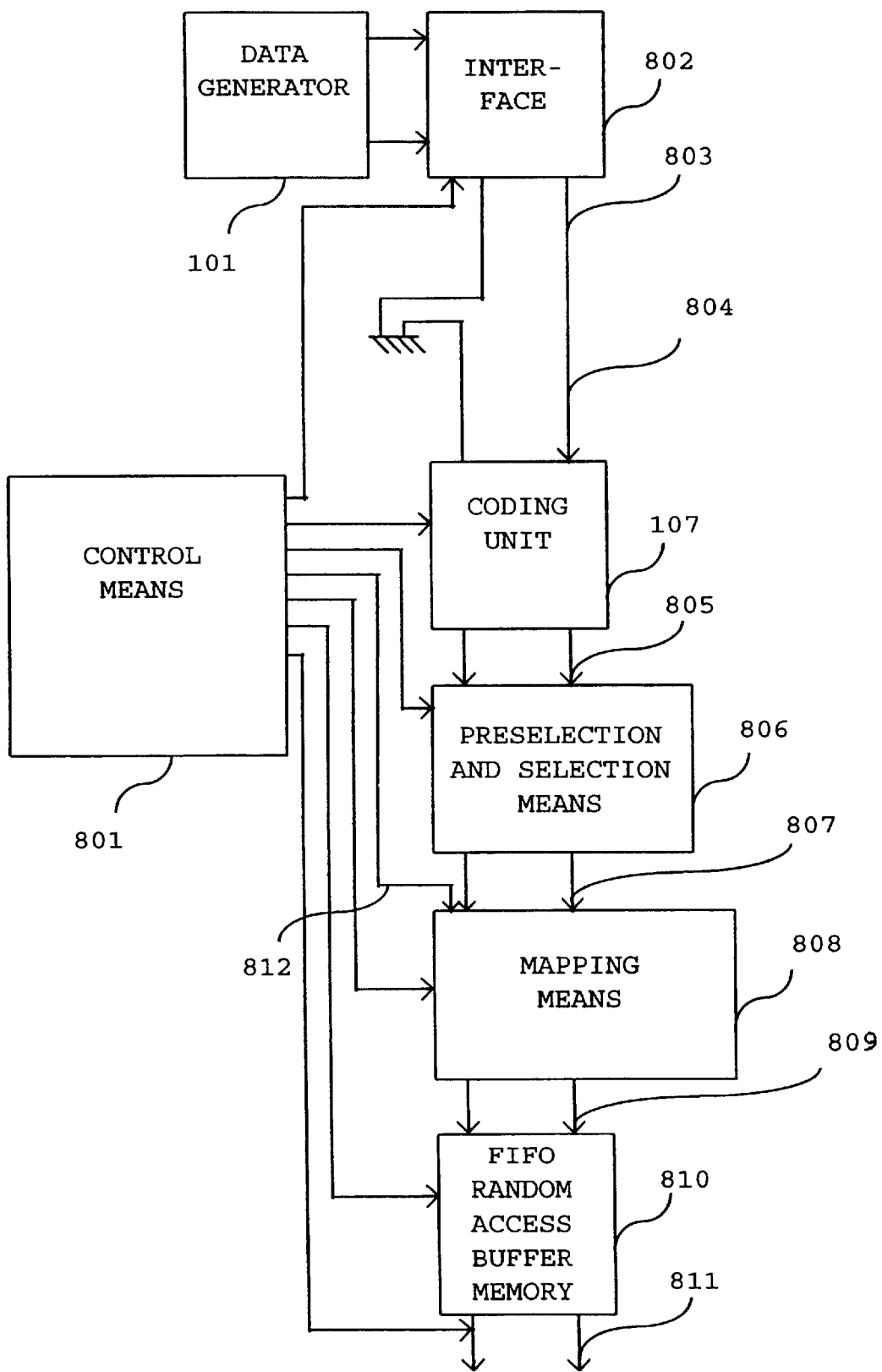
FIG. 9 illustrates an electronic embodiment of the transmission device according to the invention.

FIG. 9 illustrates such an electronic embodiment of the transmission device, in which the following follow one another on the data path:

the data generator 101, an interfacing component 802, a bus 803, a bus 804, a coding unit 107, a bus 805, a preselection and selection means 806, a bus 807, a mapping means 808, a bus 809, a random access buffer memory 810, of FIFO type, and a bus 811.

A control means 801 is connected to:

the interfacing component 802, the coding unit 107, the preselection and selection means 806, the mapping means 808, the random access buffer memory 810, and the bus 811.

This control means 801 manages the clock signals, the write and read signals and enable signals. It also allows initialisation of the components (in particular programmable components) and controls the degree of fill of the random access buffer memory 810.

The interfacing component 802 implements an interface to the standard known to persons skilled in the art under the name IEEE 1394. It is, in the example shown, a component manufactured by the American company TEXAS INSTRUMENT, and a controller managing this component.

The bus 803 has six lines which each carry, in parallel, one binary data item. The bus 804 has eight lines which, for the first six extend the six lines of the bus 803 and carry respectively the same signals and, for the last two, are connected to the ground of the electronic card shown, this ground corresponding to the binary "0" signal, and a positive voltage, greater than a predetermined value, corresponding to the binary "1" signal. The two lines thus added correspond to the most significant bits used by the coding unit 107.

The coding unit 107 is composed of the component AHA 4011 mentioned above (FIG. 1). The bus 805 has eight data lines carrying, in parallel, eight binary signals.

The preselection and selection means 806, which implements jointly the functions of the preselection means 204 and the selection means 205, is composed of a programmable component manufactured by the American company ALTERA, under the reference EPM7256.

The buses 807 and 809 each have six data lines carrying six binary signals.

The mapping means 808 is a programmable read-only memory, known to persons skilled in the art under the name PROM. In the example shown, it is a memory of CYPRESS make, referenced CY7C225A. The mapping means 808 receives, on an address bus having at least seven lines, the six lines of the data bus 807.

The line 812 goes from the control means 801 to one of the lines of the address bus of the mapping means 808 which is not connected to the data bus 807. The line 812 carries a binary signal which switches the mapping table used between that corresponding to Table 1 and that corresponding to Table 2. This switching is carried out cyclically as explained above.

The random access buffer memory 810, of FIFO type, manages the variations in flow coming from the output of the coding unit 107. It is manufactured under the reference CY7C451 of CYPRESS make.

Figure 10:
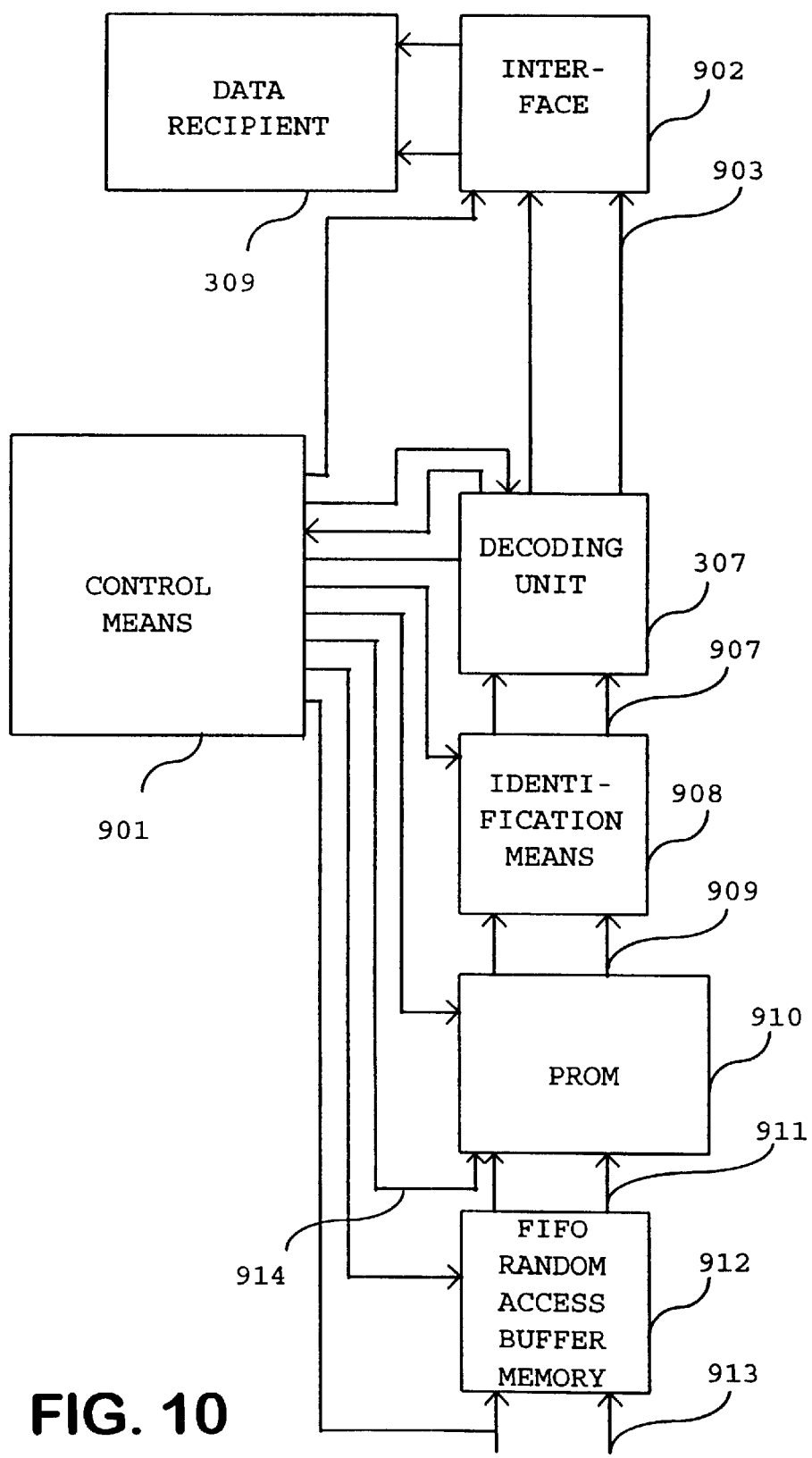
FIG. 10 illustrates an electronic embodiment of the receiving device according to the invention.

FIG. 10 illustrates an electronic embodiment of the receiving device according to the invention, in which the following follow one another:

a bus 913, a random access buffer memory 912, of FIFO type, a bus 911, a programmable read-only memory 910, a bus 909, an identification means 908, a bus 907, the decoding unit 307, a bus 905, a bus 903, an interfacing component 902 and the digital data recipient 309.

A control means 901 is connected to:

the interfacing component 902, the coding unit 307, the identification means 908, the programmable read-only memory 910, and the random access buffer memory 912.

This control means 901 manages the clock signals, the memory write and read signals and enable signals. It also allows initialization of the components (in particular programmable components) and controls the degree of fill of the random access buffer memory 912. Finally, it uses a program for detecting decoding errors, by continuously verifying that data reaching it from most significant bit output pins of the decoding unit 307 remain at binary zero values.

The interfacing component 902 implements an interface to the standard known to persons skilled in the art under the name IEEE 1394. It is, in the example shown, a component manufactured by the American company TEXAS INSTRUMENT and a controller for managing this component.

The bus 903 has six lines which each carry, in parallel, one binary data item coming from six pins of the decoding unit 307. These six pins correspond to the least significant bit outputs of the decoding unit 307.

The decoding unit 307 is composed of the component AHA 4011 mentioned above (FIGS. 1 et 3). The two most significant bit output pins of the decoding unit 307 are connected to inputs of the control means 901 and allow use of the error detection program. In addition, the decoding unit has its own error detection functions, in a manner known to persons skilled in the art.

The identification means 908 is presented with reference to FIG. 4. It is composed of a programmable component manufactured by the American company ALTERA, under the reference EPM 7256.

The buses 909, 911 and 913 each have six data lines carrying six binary signals.

The programmable read-only memory 910, known to persons skilled in the art under the name PROM, constitutes the sorting means 402 (FIG. 4) and the matching means 403. In the example shown, it is a memory of CYPRESS make, referenced CY7C225A. The address bus of the programmable read-only memory 910 has at least seven lines, six of which extend the lines of the bus 911.

The line 914 goes from the control means 901 to one of the lines of the address bus of the programmable read-only memory 910 which is not connected to the bus 911. The line 914 carries a binary signal which switches the mapping table used between that corresponding to Table 1 and that corresponding to Table 2. This switching is carried out cyclically as explained above.

The random access buffer memory 912, of FIFO type, manages the variations in flow coming from the output of the coding unit 107. It is manufactured under the reference CY7C451 of CYPRESS make.

According to a third variant, when the redundant symbols do not supply a number and digital data formats allow an exact number of digital data couples to be produced, the selection means is adapted to add so-called "stuffing" bits, to avoid de-synchronization of the transmission device.

According to a fourth variant, the rules for mapping between the component couples and the digital data vary not only for the redundant symbols, but also for the symbols to be coded, in a cyclic manner.

According to a fifth variant, the symbols to be transmitted consist of only the redundant symbols, and the mapping means 206 receives:

from the selection means 205, amplitude couples, as explained above, these amplitude couples corresponding only to redundant symbols, and from the digital data generator 101, the sextuples supplied by this generator, sextuples which the transmission means interprets as amplitude couples.

This variant is illustrated by a broken line in FIG. 2, a line which represents the direct transmission from the generator to the mapping means.

More generally than the particular embodiment presented above with reference to the accompanying drawings, and still according to the invention:

the preselection means receives so-called "to be transmitted" symbols of an alphabet having a number Q of symbols and supplies, to the selection means, digital data capable of taking T different values, T being less than Q, the number Q being equal to $2^q$, the number T being equal to $2^r$, q not being a multiple of t;

the transmission medium is of the type
wire, that is to say it has a solid physical medium between the transmission device and the receiving device, and/or electromagnetic, the transmission being performed by modulation of an electromagnetic wave, for example radio, infrared, etc, sound, the transmission on the transmission medium being performed by modulation of a sound wave.

What is claimed is:

1. A device for transmitting symbols representing a physical quantity, the device comprising:

means for formatting sequences of symbols of a first alphabet into sequences of symbols of a second alphabet, the second alphabet being strictly larger than the first one;

means for calculating redundancy symbols of the second alphabet;

means for formatting the calculated redundancy symbols into symbols of a third alphabet strictly smaller than the second one; and means for associating, to each symbol of the first and third alphabets, one signal of a predetermined set of signals.

2. A device according to claim 1, wherein the size of symbols of the third alphabet equals the size of symbols of the first alphabet.

3. A device according to claim 1, wherein the size of symbols of the third alphabet is smaller than the size of symbols of the first alphabet.

4. A device according to claim 2, wherein the means for associating associates, to each symbol of the first and third alphabets, one signal of the predetermined set of signals, in such a way that errors of the smallest amplitude in the predetermined set of signals, when converted into the second alphabet, will correspond to only one symbol of the second alphabet.

5. A device according to claim 1, further comprising transmission means adapted to perform the transmission of a signal which is amplitude modulated using two carriers in quadrature with P states, the device incorporating rules to match digital data to be transmitted with the P states and rules to match redundant digital data with the P states.

6. A device according to claim 5, wherein P is equal to 64.

7. A device according to claim 5, wherein the number of symbols of the second alphabet is equal to 256.

8. A device according to claim 5, further comprising coding means using a Reed-Solomon coding.

9. A device according to claim 8, further comprising preselection means adapted:

to receive, from the coding means, redundant symbols which belong to the second alphabet, and to supply digital data to the transmission means.

10. A device according to claim 9, wherein the preselection means is adapted to receive redundant symbols, that are each represented by a sequence of binary data, and to supply digital data items each representing segments of the respective sequences.

11. A device according to claim 9, further comprising selection means adapted to supply, to the transmission means, according to predetermined selection rules, digital data couples formed from the digital data items outputted from the preselection means.

12. A device according to claim 11, further comprising mapping means adapted to map, according to a set of predetermined mapping rules, each digital data couple selected by the selection means to one of the P states, the transmission means being adapted to perform the mapping so that each digital data item of the respective digital data couple modifies a different one of the two carriers.

13. A device according to claim 12, wherein the set of predetermined mapping rules includes at least a first rule according to which, when an estimated probability of error between two states of the P states is greater than a first predetermined value, then digital data couples corresponding to the two states have first or second digital data items of the same value.

14. A device according to claim 12, wherein:

the predetermined selection rules are cyclic, so that two digital data items separated by an integer number of selection cycles are selected in an identical manner by the selection means; and the predetermined mapping rules are cyclic, so that two identical data couples separated by an integer number of mapping cycles are mapped to the same state of the P states.

15. A device according to claim 9, wherein the preselection means is adapted to receive redundant symbols, each represented by a sequence of an even number of bits, and to supply digital data items each representing half of the bits of the sequence.

16. A device according to claim 13, wherein the set of predetermined mapping rules includes at least a rule according to which, when an estimated probability of error between two states of the P states is greater than a first predetermined value, then one of the digital data couples corresponding to the two states does not represent any digital data outputted from the preselection means.

17. A device for receiving sequences of signals produced by a device according to claim 13, the receiving device comprising the following receiving means:

identification means adapted to receive signals belonging before transmission to the first alphabet having P symbols;

demapping means adapted to demap the received signals to symbols to be decoded, the symbols belonging to the second alphabet having Q symbols; and decoding means adapted to correct errors affecting the symbols to be decoded, using predetermined decoding rules taking into account redundant symbols to be decoded, and to supply corrected symbols.

18. A device according to claim 17, wherein the signals are signals modulated by an amplitude modulation using two carriers in quadrature.

19. A device according to claim 17, wherein the receiving means is adapted to receive the signals and to associate each signal with a state of the P states.

20. A device according to claim 19, further comprising sorting means adapted to sort states associated with digital data from states associated with redundant digital data.

21. A device according to claim 20, wherein an identification means is adapted to map the states associated with the digital data to symbols to be decoded belonging to the second alphabet having Q symbols.

22. A device according to claim 20, wherein an identification means is adapted to map the states associated with the redundant digital data to redundant symbols to be decoded belonging to the second alphabet having Q symbols.

23. A device according to claim 17, wherein the decoding means is adapted to use a Reed-Solomon decoding.

24. A device according to claim 20, wherein the receiving means is adapted to receive a signal which is amplitude modulated using two carriers in quadrature with 64 states, and to supply the associated state of the signal to the sorting means.

25. A device according to claim 20, wherein the demapping means is adapted to use cyclic predetermined demapping rules, specified by a cycle number, and such that signals corresponding to digital data items separated by an integer number of demapping cycles are demapped in an identical manner by the demapping means.

26. A device according to claim 17, wherein the number Q is equal to $2^q$, the number P is equal to $2^p$, the exponent q not being a multiple of the exponent p.

27. A device according to claim 17, wherein a translation means is adapted to receive corrected symbols each represented by a sequence of bits and to supply transmitted digital data items each representing segments of the sequences of bits.

28. A device according to claim 27, wherein the translation means is adapted to remove predetermined digital data from each corrected symbol in order to form a transmitted digital data item.

29. A device according to claim 12, wherein the means for associating associates, to each symbol of the first and third alphabets, one signal of the predetermined set of signals, in such a way that, when the error of a demodulated received signal has a probability larger than a first predetermined value, then the error of the demodulated received signal will correspond to an error in only one symbol of the second alphabet.

30. A network comprising:
a transmission device for transmitting symbols representing a physical quantity, the transmission device comprising:
means for formatting sequences of symbols of a first alphabet into sequences of symbols of a second alphabet, the second alphabet being strictly larger than the first one;
means for calculating redundancy symbols of the second alphabet;
means for formatting the calculated redundancy symbols into symbols of a third alphabet strictly smaller than the second one; and
means for associating, to each symbol of the first and third alphabets, one signal of a predetermined set of signals; and
a receiving device for receiving signals, possibly affected by errors, through a transmission medium between the transmission device and the receiving device, the signals representing digital data belonging to the first alphabet having P symbols, the receiving device comprising:
identification means adapted to receive signals corresponding to digital data belonging to the alphabet having P symbols and to demap the received signals to symbols to be decoded, belonging to the alphabet having Q symbols, with Q strictly greater than P;
decoding means adapted to correct errors affecting the symbols to be decoded, using predetermined decoding rules taking into account redundant symbols to be decoded, and to supply corrected symbols; and
translation means adapted to supply transmitted digital data having P possible states, and successively representing, according to predetermined translation rules, corrected symbols.

31. A method for transmitting symbols representing a physical quantity, the method comprising the steps of:
formatting sequences of symbols of a first alphabet into sequences of symbols of a second alphabet, the second alphabet being strictly larger than the first one;
calculating redundancy symbols of the second alphabet;
formatting the calculated redundancy symbols into symbols of a third alphabet strictly smaller than the second one; and
associating, to each symbol of the first and third alphabets, one signal of a predetermined set of signals.

32. A method according to claim 31, wherein the size of symbols of the third alphabet equals the size of symbols of the first alphabet.

33. A method according to claim 31, wherein the size of symbols of the third alphabet is smaller than the size of symbols of the first alphabet.

34. A method according to claim 32, wherein the associating step comprises the step of associating, to each symbol of the first and third alphabets, one signal of the predetermined set of signals, in a such way that errors of the smallest amplitude in the predetermined set of signals, when converted into the second alphabet, will correspond to only one symbol of the second alphabet.

35. A method according to claim 31, further comprising a transmission step, during which the transmission is performed of a signal which is amplitude modulated using two carriers in quadrature with P states, the device incorporating rules to match digital data to be transmitted with the P states and rules to match redundant digital data with the P states.

36. A method according to claim 35, wherein P is equal to 64.

37. A method according to claim 35, wherein the number of symbols of the second alphabet is equal to 256.

38. A method according to claim 35, further comprising a coding step, during which a Reed-Solomon coding is used.

39. A method according to claim 38, further comprising a preselection step during which:
following the coding step, the redundant symbols which belong to the second alphabet are received; and
digital data are supplied which are then processed during the transmission step.

40. A method according to claim 39, wherein, during the preselection step, redundant symbols, that are each represented by a sequence of binary data are received, and digital data items, each representing segments of the respective sequences, are supplied.

41. A method according to claim 39, further comprising a selection step during which, with a view to the transmission step, according to predetermined selection rules, digital data couples are supplied, having been successively processed during the preselection step.

42. A method according to claim 41, further comprising a mapping step during which, according to a set of predetermined mapping rules, each digital data couple selected during the selection step is mapped to one of the P states, and, during the transmission step, the mapping is performed so that each digital data item of the respective digital data couple modifies a different one of the two carriers.

43. A method according to claim 42, wherein the set of predetermined mapping rules includes at least a first rule according to which, when an estimated probability of error between two states of the P states is greater than a first predetermined value, then the digital data couples corresponding to the two states have first or second digital data items of the same value.

44. A method according to claim 41, wherein:
the predetermined selection rules are cyclic, so that two digital items separated by an integer number of selection cycles are selected in an identical manner during the selection step; and
the predetermined mapping rules are cyclic, so that two identical couples separated by an integer number of mapping cycles being mapped to the same state of the P states.

45. A method according to claim 39, wherein, during the preselection step, redundant symbols each represented by a sequence of an even number of bits are received and digital data items each representing half of the bits of the sequence are supplied.

46. A method according to claim 43, wherein the set of predetermined mapping rules includes at least a rule according to which, when an estimated probability between two states of the P states is greater than a first predetermined value, then one of the digital data couples corresponding to the two states does not represent any digital data processed during the preselection step.

47. A method for receiving sequences of signals produced by a method according to claim 43, the receiving method comprising the following receiving steps:
an identification step, during which signals belonging before transmission to the first alphabet having P symbols are received;
a demapping step, during which received signals are demapped to symbols to be decoded, the symbols belonging to the second alphabet having Q symbols; and
a decoding step, during which errors affecting the symbols to be decoded are corrected, using predetermined decoding rules taking into account redundant symbols to be decoded, and corrected symbols are supplied.

48. A method according to claim 47, wherein the signals are signals modulated by an amplitude modulation using two carriers in quadrature.

49. A method according to claim 47, further comprising a receiving step during which the signals are received and associated with a state of the P states.

50. A method according to claim 47, further comprising a sorting step during which a selection is made between states associated with digital data and states associated with redundant digital data.

51. A method according to claim 50, wherein, during the identification step, the states associated with the digital data is mapped to a symbol to be decoded belonging to the second alphabet having Q symbols.

52. A method according to claim 50, wherein, during the identification step, the states associated with the redundant digital data are mapped to redundant symbols to be decoded belonging to the second alphabet having Q symbols.

53. A method according to claim 47, wherein, during the decoding step, a Reed-Solomon decoding is used.

54. A method according to claim 50, wherein, during the receiving step, a signal which is amplitude modulated using two carriers in quadrature with 64 states, is received and the associated state of the signal is supplied, the associated state then being processed during the sorting step.

55. A method according to claim 47, wherein during the demapping step, cyclic predetermined demapping rules are used, specified by a cycle number, and such that signals corresponding to digital data items separated by an integer number of demapping cycles are demapped in an identical manner during the demapping step.

56. A method according to claim 47, wherein the number Q is equal to $2^q$, the number P is equal to $2^p$, the exponent q not being a multiple of the exponent p.

57. A method according to claim 47, further comprising a translation step in which corrected symbols, each represented by a sequence of bits, are received and digital data items, each representing segments of the sequences of bits, are supplied.

58. A method according to claim 57, wherein, during the translation step, predetermined digital data are removed from each corrected symbol in order to form a transmitted digital data item.

59. A method according to claim 42, wherein, during the associating step, one signal of the predetermined set of signals is associated to each symbol of the first and third alphabets, in such a way that, when the error of a demodulated received signal has a probability larger than a first predetermined value, then the error of the demodulated signal will correspond to an error in only one symbol of the second alphabet.

* * * * *

UNITED STATES PATENT AND TRADEMARK OFFICE
CERTIFICATE OF CORRECTION

| | |
|---|---|
| PATENT NO. | : 6,542,553 B1 |
| APPLICATION NO. | : 08/994325 |
| DATED | : April 1, 2003 |
| INVENTOR(S) | : Claude Le Dantec et al. |

It is certified that error appears in the above-identified patent and that said Letters Patent is hereby corrected as shown below:

COLUMN 5

Line 14, "value. ¶ By" should read --value. ¶ Correlatively, according to preferential characteristics of the third aspect of the invention, the transmission method as briefly explained above has a mapping step during which, according to a set of predetermined so-called "mapping" rules, each digital data couple selected during the selection step is mapped to an amplitude couple, and, during the transmission step, the transmission of the signal is performed in quadrature, its two components being respectively modified by the first and second amplitudes of the amplitude couples.
    ¶ By--.

COLUMN 8

Line 35, "generator 101," should read --generator 101;--.

COLUMN 10

Line 54, "medium 110." should read --medium 110;--.

COLUMN 11

Line 59, "item" should read --item;--.

COLUMN 12

Line 65, "et" should read --and--.

COLUMN 18

Line 37, ""immediate"," should read --"immediate"--.

COLUMN 20

Line 26, "et" should read --and--.

UNITED STATES PATENT AND TRADEMARK OFFICE
CERTIFICATE OF CORRECTION

PATENT NO.       : 6,542,553 B1
APPLICATION NO.  : 08/994325
DATED            : April 1, 2003
INVENTOR(S)      : Claude Le Dantec et al.

It is certified that error appears in the above-identified patent and that said Letters Patent is hereby corrected as shown below:

COLUMN 21

Line 36, "formatting" should read --replacing--;
Line 37, "into" should read --by--;
Line 38, "second one;" should read --second one, the symbols of the third alphabet being constituted by a part of one of the calculated redundancy symbols or parts of at least two calculated redundancy symbols;--;
Line 40, "associating, to" should read --mapping one signal of a predetermined set of signals for--;
Line 41, "one signal of a predetermined set of signals." should read --wherein the symbols of the third alphabet are constituted of parts of at least two calculated redundancy symbols being mapped using cyclic predetermined mapping rules.--;
Line 49 should read --mapping operates--; and
Line 50, "alphabets, one signal of the predetermined set of signals," should be deleted.

COLUMN 22

Line 13, "further comprising" should read --wherein the--;
Line 14, "adapted" should read --are adapted-- and "a set of" should read --said cyclic--;
Line 20, "set of" should read --cyclic--;
Line 21, "includes" should read --include--;
Line 41, "set of" should read --cyclic--; and
Line 42, "includes" should read --include--.

COLUMN 23

Line 35, "means for" should read --means for mapping operates--;
Line 36, should be deleted;
Line 37, "alphabets, one signal of the predetermined set of signals," should be deleted;
Line 53, "formatting" should read --replacing--;
Line 54, "into" should read --by--;
Line 55, "second one;" should read --second one, the symbols of the third alphabet being constituted by a part of one of the calculated redundancy symbols or parts of at least two calculated redundancy symbols;--

UNITED STATES PATENT AND TRADEMARK OFFICE
CERTIFICATE OF CORRECTION

PATENT NO.      : 6,542,553 B1
APPLICATION NO. : 08/994325
DATED           : April 1, 2003
INVENTOR(S)     : Claude Le Dantec et al.

It is certified that error appears in the above-identified patent and that said Letters Patent is hereby corrected as shown below:

COLUMN 23 (continued)

Line 56, "associating, to" should read --mapping one signal of a predetermined set of signals for--;
Line 57, "one signal of a predetermined set of" should read --wherein the symbols of the third alphabet are constituted of parts of at least two calculated redundancy symbols being mapped using cyclic predetermined mapping rules; and--; and
Line 58, "signals; and" should be deleted.

COLUMN 24

Line 18, "formatting" should read --replacing-- and "into" should read --by--;
Line 20, "one; and" should read --one, the symbols of the third alphabet being constituted by a part of one of the calculated redundancy symbols or parts of at least two calculated redundancy symbols; and--;
Line 21, "associating, to" should read --mapping one signal of a predetermined set of signals for--;
Line 22, "one signal of a predetermined set of signals." should read --¶ wherein the symbols of the third alphabet are constituted of parts of at least two calculated redundancy symbols being mapped using cyclic predetermined mapping rules.--;
Line 29, "associ-" should read --mapping--;
Line 30, "ating" should be deleted and "associating, to" should read --mapping one signal of the predetermined set of signals for--;
Line 31, "one signal of the predeter-" should be deleted;
Line 32, "mined set of signals," should be deleted and "a such" should read --such a--;
Line 39, "device" should read --method--; and
Line 66, "a set of" should read --said cyclic--.

COLUMN 25

Line 5, "set of" should read --cyclic--;
Line 6, "includes" should read --include--;
Line 19, "being" should read --are--;
Line 26, "set of" should read --cyclic--; and
Line 27, "includes" should read --include--.

UNITED STATES PATENT AND TRADEMARK OFFICE
CERTIFICATE OF CORRECTION

| | |
|---|---|
| PATENT NO. | : 6,542,553 B1 |
| APPLICATION NO. | : 08/994325 |
| DATED | : April 1, 2003 |
| INVENTOR(S) | : Claude Le Dantec et al. |

It is certified that error appears in the above-identified patent and that said Letters Patent is hereby corrected as shown below:

COLUMN 26

Line 4, "claim 47," should read --claim 49,--;
    Line 10, "is" should read --are--; and
    Line 42, "associating" should read --mapping--.

Signed and Sealed this

Twenty-fifth Day of March, 2008

JON W. DUDAS
*Director of the United States Patent and Trademark Office*